(12) United States Patent
Ishijima et al.

(10) Patent No.: US 9,708,003 B2
(45) Date of Patent: Jul. 18, 2017

(54) PARKING ASSIST DEVICE

(71) Applicants: Hironobu Ishijima, Miyoshi (JP); Eriko Yamazaki, Toyota (JP); Keisuke Oyama, Toyota (JP); Hisashi Satonaka, Susono (JP); Hidehiko Miyoshi, Kariya (JP); Keisuke Hata, Toyota (JP)

(72) Inventors: Hironobu Ishijima, Miyoshi (JP); Eriko Yamazaki, Toyota (JP); Keisuke Oyama, Toyota (JP); Hisashi Satonaka, Susono (JP); Hidehiko Miyoshi, Kariya (JP); Keisuke Hata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/392,177

(22) PCT Filed: Jun. 26, 2013

(86) PCT No.: PCT/JP2013/067559
§ 371 (c)(1),
(2) Date: Dec. 23, 2015

(87) PCT Pub. No.: WO2014/207850
PCT Pub. Date: Dec. 31, 2014

(65) Prior Publication Data
US 2016/0185389 A1 Jun. 30, 2016

(51) Int. Cl.
*B62D 15/02* (2006.01)

(52) U.S. Cl.
CPC ................. *B62D 15/0285* (2013.01)

(58) Field of Classification Search
None
See application file for complete search history.

(56) References Cited

U.S. PATENT DOCUMENTS

| 2011/0273310 A1 | 11/2011 | Kadowaki et al. |
| 2012/0072067 A1 | 3/2012 | Jecker et al. |

(Continued)

FOREIGN PATENT DOCUMENTS

| CN | 102883938 A | 1/2013 |
| CN | 103930334 A | 7/2014 |

(Continued)

OTHER PUBLICATIONS

Office Action issued in U.S. Appl. No. 14/089,349 on Mar. 23, 2015.
(Continued)

*Primary Examiner* — Faris Almatrahi
*Assistant Examiner* — Tamara Weber
(74) *Attorney, Agent, or Firm* — Finnegan, Henderson, Farabow, Garrett & Dunner, LLP

(57) ABSTRACT

When performing automatic control of a steering device that assists a host vehicle to be pulled into or out of a parking space, an electronic control unit performs the following procedure. When there is, as a path for pulling the vehicle into or out of the parking space, a path in which a predicted temperature of the steering device for when the automatic control is performed to move the vehicle along the path would be lower than an allowable upper limit value, the electronic control unit starts the automatic control to move the vehicle along the path. In contrast, when there is no path in which the predicted temperature is lower than the allowable upper limit value, the electronic control unit prohibits the automatic control.

10 Claims, 15 Drawing Sheets

(56) References Cited

U.S. PATENT DOCUMENTS

| | | | |
|---|---|---|---|
| 2013/0043989 A1* | 2/2013 | Niemz | B62D 5/0496 340/438 |
| 2014/0129091 A1 | 5/2014 | Yamazaki et al. | |
| 2016/0185389 A1 | 6/2016 | Ishijima | |

FOREIGN PATENT DOCUMENTS

| | | |
|---|---|---|
| EP | 2 921 375 A1 | 9/2015 |
| JP | 2002-211425 A | 7/2002 |
| JP | 2003-175854 A | 6/2003 |
| JP | 2003-312413 | 11/2003 |
| JP | 2004-249913 A | 9/2004 |
| JP | 2006-044437 A | 2/2006 |
| JP | 2007-030678 A | 2/2007 |
| JP | 2008-307913 A | 12/2008 |
| JP | 2009-190531 | 8/2009 |
| JP | 2010-195224 A | 9/2010 |
| JP | 2010-228591 | 10/2010 |
| JP | 2012-66709 | 4/2012 |
| WO | WO 2014/196040 A1 | 12/2014 |

OTHER PUBLICATIONS

Office Action issued in U.S. Appl. No. 14/895,015 on Sep. 16, 2016.
Supplemental Notice of Allowability issued in U.S. Appl. No. 14/893,671 on Oct. 28, 2016.
Notice of Allowance issued in U.S. Appl. No. 14/893,671 on Jan. 31, 2017.
Notice of Allowance issued in U.S. Appl. No. 14/895,015 on Apr. 20, 2017.

\* cited by examiner

| Path K1 | |
|---|---|
| Number of Times of reversal of the steering direction | Steering Ratio |
| 1 | Leftward Steering 100% |
| 2 | Rightward Steering 100% |
| 3 | Leftward Steering 100% |
| 4 | Rightward Steering 100% |
| 5 | Leftward Steering Ra%(<100%) |

| Path K2 ||
|---|---|
| Number of Times of reversal of the steering direction | Steering Ratio |
| 1 | Leftward Steering Rb%(<100%) |
| 2 | Rightward Steering Rb% |
| 3 | Leftward Steering Rb% |
| 4 | Rightward Steering Rb% |
| 5 | Leftward Steering Rc%(≦Rb%) |

Fig.15

| Path K3 ||
|---|---|
| Number of Times of reversal of the steering direction | Steering Ratio |
| 1 | Leftward Steering Rd% (<Rb%) |
| 2 | Rightward Steering Rd% |
| 3 | Leftward Steering Rd% |
| 4 | Rightward Steering Rd% |
| 5 | Leftward Steering Rd% |
| 6 | Rightward Steering Rd% |
| 7 | Leftward Steering Re% (≦Rd%) |

Fig.16

| Path K4 ||
|---|---|
| Number of Times of reversal of the steering direction | Steering Ratio |
| 1 | Leftward Steering 100% |
| 2 | Rightward Steering 100% |
| 3 | Leftward Steering Ra% (<100%) |
| 4 | Rightward Steering 100% |
| 5 | Leftward Steering 100% |

| Path K5 ||
|---|---|
| Number of Times of reversal of the steering direction | Steering Ratio |
| 1 | Leftward Steering Rf% (<Rb%) |
| 2 | Rightward Steering Rf% |
| 3 | Leftward Steering Rf% |
| 4 | Rightward Steering Rf% |
| 5 | Leftward Steering Rg% (≦Rf%) |

(a) (b)

PARKING ASSIST DEVICE

CROSS-REFERENCE TO RELATED APPLICATIONS

This application is a national phase application of International Application No. PCT/JP2013/067559, filed Jun. 26, 2013, the content of which is incorporated herein by reference.

TECHNICAL FIELD

The present invention relates to a parking assist device.

BACKGROUND ART

Some vehicles such as automobiles are known to be equipped with a parking assist device. The parking assist device assists the vehicle when the vehicle is pulled into a certain parking space and pulled out of the parking space. To pull a vehicle into or out of a parking space, the parking assist device operates the steerable wheels of the vehicle through automatic control of the steering device, instead of using steering operation by the driver. Through the automatic control of the steering device, the steerable wheels are operated to pull the vehicle into or out of the parking space without steering operation by the driver. In this manner, the vehicle is assisted to be pulled into or out of the parking space.

When a vehicle is assisted to be pulled into or out of a parking space by a parking assist device, the steerable wheels are operated solely by the power of the actuator, such as a motor, of the steering device through the automatic control without depending on any steering operation by the driver. This increases the load acting on the steering device when the automatic control is performed compared to usual times. The temperature of the steering device thus tends to increase. In this regard, Patent Document 1 describes a configuration in which automatic control is prohibited if the temperature of the steering device is higher than the maximum value of a first temperature range. As a result, even if the temperature of the steering device increases after the automatic control is started, the temperature of the steering device is maintained at a sufficiently low value.

PRIOR ART DOCUMENT

Patent Document

Patent Document 1: Japanese Laid-Open Patent Publication No. 2010-228591

SUMMARY OF THE INVENTION

Problems that the Invention is to Solve

To maintain the temperature of the steering device at a sufficiently low value during execution of the automatic control, it is preferable to set the maximum value of the first temperature range to a low value such that the automatic control is reliably prohibited under the least favorable condition in terms of temperature increase of the steering device in the automatic control. However, if the maximum value of the first temperature range is set at such a low value, the condition for executing the automatic control will be stringent, thus decreasing the frequency of execution of the automatic control.

In Patent Document 1, during execution of the automatic control, if the temperature of the steering device becomes higher than the maximum value of a second temperature range, which is set lower than the maximum value of the first temperature range, the automatic control is stopped. In this case, even if the maximum value of the first temperature range is set relatively high to relax the condition for executing the automatic control to increase the frequency of execution of the automatic control, the automatic control is stopped when the temperature of the steering device becomes higher than the maximum value of the second temperature range during execution of the automatic control. In this manner, temperature increase of the steering device is avoided.

However, if the automatic control is stopped before completion, or, in other words, if the vehicle cannot be pulled into or out of the parking space completely through the automatic control, the problem described below occurs. That is, after the automatic control is stopped before completion, the driver must manually operate the steering wheel to continuously pull the vehicle into or out of the parking space, which is troublesome for the driver.

Accordingly, it is an objective of the present invention to provide a parking assist device capable of increasing the frequency of execution of automatic control as much as possible while avoiding suspension of automatic control caused by temperature increase of a steering device after the automatic control is started.

Means for Solving the Problems

Means for achieving the above objective and advantages thereof will now be discussed.

To achieve the forgoing objective and in accordance with one aspect of the present invention, a parking assist device adapted to assist a vehicle to be pulled into or out of a parking space through automatic control of a steering device is provided. The parking assist device includes a controller. When there is, as a path for pulling the vehicle into or out of the parking space, a path in which a predicted temperature of the steering device for when the automatic control is performed to move the vehicle along the path would be lower than an allowable upper limit value, the controller is configured to start the automatic control to move the vehicle along the path. When there is no such a path, the controller is configured to prohibit the automatic control. This ensures avoidance of start of the automatic control in a state in which the temperature of the steering device is likely to become higher than or equal to the allowable upper limit value during execution of the automatic control. If the automatic control is started in the aforementioned state, the temperature of the steering device may become higher than or equal to the allowable upper limit value during execution of the automatic control. In this case, to avoid such temperature increase, the automatic control may have to be stopped. However, the automatic control is prohibited from being started in the aforementioned state, thus ensuring avoidance of suspension of the automatic control due to temperature increase of the steering device during execution of the automatic control. Further, when there is a path in which the predicted temperature would be lower than the allowable upper limit value, the automatic control is started to move the vehicle along that path. This increases the frequency of execution of the automatic control as much as possible.

The controller may be configured to prohibit or start the automatic control in the following manner. That is, the controller obtains a plurality of candidate paths each as a path for pulling the vehicle into or out of the parking space and calculates predicted temperatures of the steering device sequentially for cases in which the automatic control is performed to move the vehicle along the respective obtained candidate paths. The controller prohibits the automatic control when the predicted temperatures are higher than or equal to the allowable upper limit value. When any of the predicted temperature is lower than the allowable upper limit value, the controller starts the automatic control to move the vehicle along the path corresponding to that predicted temperature. When the candidate paths include a path in which the predicted temperature would be maintained lower than the allowable upper limit value, the automatic control is started to move the vehicle along that path. This increases the frequency of execution of the automatic control as much as possible.

The controller may be configured to obtain, as the candidate paths for the vehicle, paths that are different in traveling distance, number of times of reversal of a steering direction, and manner in which a steering ratio is changed. The predicted temperature of the steering device for when the automatic control is performed to move the vehicle along a certain path is influenced by factors corresponding to the path of the vehicle, which are the traveling distance, the number of times of reversal of the steering direction, and the manner in which the steering ratio changes. Therefore, by determining paths that are different in traveling distance, numbers of times of reversal of the steering direction, and manner in which the steering ratio changes, the number of the candidate paths is increased, thus increasing the likelihood that a path in which the predicted temperature will be maintained lower than the allowable upper limit value is obtained. This increases the frequency of execution of the automatic control as much as possible.

The controller may be configured to prohibit or start the automatic control in the following manner. That is, the controller obtains a first candidate path for pulling the vehicle into or out of the parking space and calculates a predicted temperature of the steering device for when the automatic control is performed to move the vehicle along the first candidate path. The controller starts the automatic control to move the vehicle along the first candidate path if the predicted temperature is lower than the allowable upper limit value. The controller prohibits the automatic control if the predicted temperature is higher than or equal to the allowable upper limit value. Further, the controller obtains a second candidate path for pulling the vehicle into or out of the parking space after prohibiting the automatic control, and selectively starts and prohibits the automatic control based on the predicted temperature for the second candidate path in the same manner as that for the first candidate path. Therefore, after the automatic control is prohibited, as many other candidate paths as possible are successively obtained until a path in which the predicted temperature will be maintained lower than the allowable upper limit value is obtained. When a path in which the predicted temperature will be maintained lower than the allowable upper limit value is obtained, the automatic control is started to move the vehicle along that path. This increases the frequency of execution of the automatic control as much as possible.

As in the case of obtaining a plurality of candidate paths, the controller may be configured to obtain, as the second candidate path for the vehicle, a path that is different from the first candidate path in traveling distance, number of times of reversal of a steering direction, and manner in which a steering ratio is changed.

The controller may be configured to be capable of obtaining, as the candidate paths, not only a path that can be implemented through the automatic control without needing steering operation by the driver, but also a path that can be implemented through the automatic control assisted by steering operation by the driver. This further increases the number of the candidate paths, thus increasing the likelihood that a path in which the predicted temperature will be maintained lower than the allowable upper limit value is obtained. This increases the frequency of execution of the automatic control as much as possible.

The controller may be configured to, when starting the automatic control, inform the driver of contents of assist by the automatic control in pulling the vehicle in or out of the parking space. Specifically, if a different path is employed to move the vehicle each time the automatic control is started, which tends to cause discomfort to the driver, the driver may stop the automatic control due to the discomfort. However, as has been described, the driver is notified of the content of pulling-in or pulling out assist through the automatic control. This restrains the driver from stopping the automatic control due to the discomfort caused by movement of the vehicle after the automatic control is started.

When the automatic control is performed to pull the vehicle into one of parking spaces that are arranged side by side, the candidate paths include a path in which reversal between rightward steering and leftward steering occurs in a single period of advancing or reversing of the vehicle and a path in which such reversal does not occur. By including a path in which the aforementioned reversal occurs in the candidate paths as has been described, the number of the obtained candidate paths is further increased. This increases the frequency of execution of the automatic control as much as possible. However, if the automatic control is performed to move the vehicle along the path in which reversal will occur, it is likely that discomfort will be caused to the driver by corresponding movement of the vehicle. Taking this into consideration, the controller is configured to employ, as a path for which the controller determines whether to start or prohibit the automatic control, the path in which reversal in the steering direction does not occur in priority to the path in which the reversal occurs. This restrains the discomfort caused to the driver by movement of the vehicle as much as possible when the automatic control is performed to move the vehicle along the path in which reversal will occur, while increasing the frequency of execution of the automatic control.

BRIEF DESCRIPTION OF THE DRAWINGS

FIG. 15 is a table representing the number of times of reversal of the steering direction and changes in the steering ratio in a path K3;

FIG. 16 is a table representing the number of times of reversal of the steering direction and changes in the steering ratio in a path K4;

MODES FOR CARRYING OUT THE INVENTION

First Embodiment

A parking assist device according to a first embodiment will now be described with reference to FIGS. 1 to 20.

Figure 1:
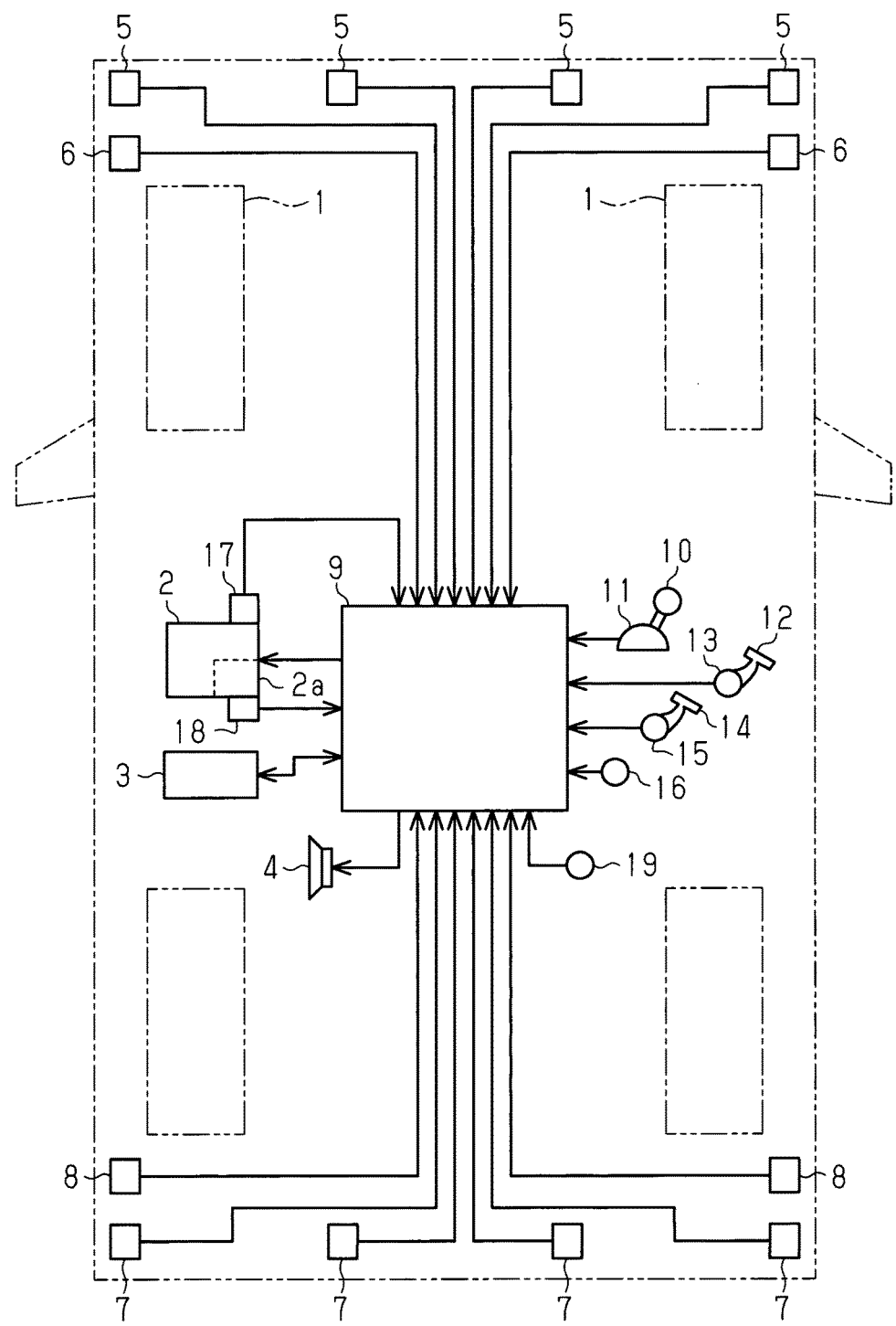
FIG. 1 is a schematic diagram showing a vehicle employing a parking assist device as a whole.

The vehicle illustrated in FIG. 1 includes a steering device 2, which operates steerable wheels 1 to adjust the advancing direction of the vehicle. The steering device 2 operates the steerable wheels 1 through steering operation by the driver and has a function of assisting in the driver's steering operation by means of a motor 2a. The steering device 2 is also capable of operating the steerable wheels 1 solely through the motor 2a, regardless of with or without the driver's steering operation. For the driver seat of the vehicle, a display panel 3 with a touch sensor and a speaker 4 are provided. The display panel 3 displays information regarding driving and is manipulated by the driver for various purposes. The speaker 4 provides information regarding driving and alarms the driver using sound.

Clearance sonars 5 for detecting whether there is an object in the vicinity of the front end (the upper end as viewed in FIG. 1) of the vehicle are attached to the front end of the vehicle. Ultrasonic sensors 6 for detecting whether there is an object at the corresponding side of the vehicle in the width direction are attached to the side surfaces of the front portion of the vehicle in the width direction (the lateral direction as viewed in the drawing). Clearance sonars 7 for detecting whether there is an object in the vicinity of the rear end (the lower end as viewed in the drawing) of the vehicle are attached to the rear end of the vehicle. Ultrasonic sensors 8 for detecting whether there is an object at the corresponding side of the vehicle in the width direction are attached to the side surfaces of the rear portion of the vehicle in the width direction.

The clearance sonars 5, 7 and the ultrasonic sensors 6, 8 are connected to an electronic control unit 9, which performs various types of control on the vehicle. The electronic control unit 9 is connected to a shift position sensor 11 for detecting the position of a shift lever 10, which is manipulated by the driver, an accelerator position sensor 13 for detecting the depression amount of an accelerator pedal 12, which is depressed by the driver, and a brake switch 15 for detecting whether a brake pedal 14 is depressed by the driver. The electronic control unit 9 is also connected to a vehicle wheel speed sensor 16 for detecting the rotation speed of a wheel (such as the steerable wheels 1) of the vehicle, an angle sensor 17 for detecting the steering operation angle of the steering device 2, a temperature sensor 18 for detecting the temperature of a motor 2a of the steering device 2, and a yaw rate sensor 19 for detecting the changing rate of the rotation angle when the vehicle turns.

The electronic control unit 9 controls the steering device 2, the display panel 3, and the speaker 4 and receives signals from the display panel 3 based on manipulation of the display panel 3 by the driver. When the vehicle is pulled into (parked in) a predetermined parking space or pulled out of (started from) the parking space, the electronic control unit 9 assists the vehicle to be pulled into or out of the parking space. That is, to pull the vehicle into the parking space, the electronic control unit 9 operates the steerable wheels 1 through automatic control of the steering device 2 (the motor 2a), instead of using steering operation by the driver. In this manner, the vehicle is assisted to be pulled into or out of the parking space by the electronic control unit 9.

Such assist for the vehicle to pull the vehicle into the parking space (hereinafter, referred to as pulling-in assist) is started if the pulling-in assist for the vehicle with respect to the parking space is requested through manipulation of the display panel 3 by the driver. Also, assist for the vehicle to pull the vehicle out of the parking space (hereinafter, referred to as pulling-out assist) is started if the pulling-out assist for the vehicle with respect to the parking space is requested through manipulation of the display panel 3 by the driver. Hereinafter, the pulling-in assist and the pulling-out assist will each be described generally.

[Pulling-in Assist]

After the pulling-in assist is started, the electronic control unit 9 instructs the driver to perform measurement starting operation as preparation for size measurement of the parking space through display on the display panel 3 and sound from the speaker 4. For example, the driver is instructed to stop the host vehicle A in a front-facing state at the position represented by the solid lines in FIG. 2, which is the position beside the parking space P1 between other vehicles B and C, at which the host vehicle A is located immediately before reaching the zone corresponding to the parking space P1 after advancing toward the parking space P1. Then, with the host vehicle A stopped at the position, the driver is instructed to release the brake pedal 14 with the shift lever 10 (FIG. 1) at the drive position.

On condition that the driver has accomplished the above-described measurement starting operation, the electronic control unit 9 performs a measurement procedure for measuring the size of the parking space P1 (FIG. 2) using the clearance sonars 5, 7 and the ultrasonic sensors 6, 8. In the measurement procedure, the host vehicle A is moved from the position represented by the solid lines in FIG. 2 to the position represented by the long dashed double-short dashed lines, which is the position at which the host vehicle A is located immediately after passing the zone beside the parking space P1. While the host vehicle A is moved from the position represented by the solid lines to the position represented by the long dashed double-short dashed lines, the electronic control unit 9 monitors signals from the clearance sonars 5, 7, the ultrasonic sensors 6, 8, the vehicle wheel speed sensor 16, the angle sensor 17, and the yaw rate sensor 19, which are illustrated in FIG. 1. Then, based on the signals from these sensors, the electronic control unit 9 determines the size of the parking space P1 and the position of the host vehicle A relative to the parking space P1.

Figure 2:
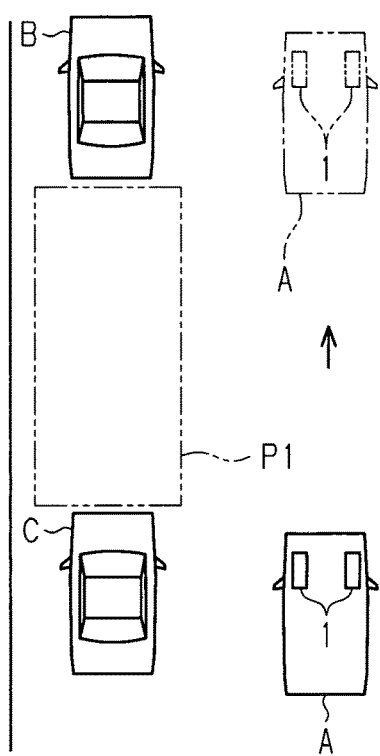
FIG. 2 is a schematic diagram illustrating movement of a host vehicle when the size of a parking area is measured.

Then, based on the size of the parking space P1, the electronic control unit 9 determines the path by which the target vehicle A will be pulled into the parking space P1 from the position represented by the long dashed double-short dashed lines in FIG. 2. Specifically, the electronic control unit 9 stores the size of the host vehicle A, which depends on the specifications of the host vehicle A. Therefore, based on the margin of the size of the parking space P1 in relation to the size of the host vehicle A, the electronic control unit 9 determines the aforementioned pulling-in path. The electronic control unit 9 then instructs the driver to manipulate the accelerator pedal 12, the brake pedal 14, and the shift lever 10 such that the host vehicle A moves along the path obtained in the above-described manner. The electronic control unit 9 also performs the automatic control of the steering device 2 (the motor 2*a*), in correspondence with manipulation by the driver according to instructions. The automatic pulling-in control operates the steerable wheels 1 to move the host vehicle A along the aforementioned path solely through activation of the motor 2*a* of the steering device 2, without steering operation by the driver. In this manner, the host vehicle A is assisted to be pulled into the parking space P1. In such assist for the host vehicle A to pull the host vehicle A into the parking space P1, not only the steering device 2 is automatically operated as has been described, but also drive force adjustment, brake actuation, and shift position change of the host vehicle A for moving the host vehicle A along the aforementioned path may be automatically performed.

FIGS. 3 to 8 illustrate an example of operating modes of the steerable wheels 1 according to the automatic control for moving the host vehicle A along the aforementioned path.

Figure 3:
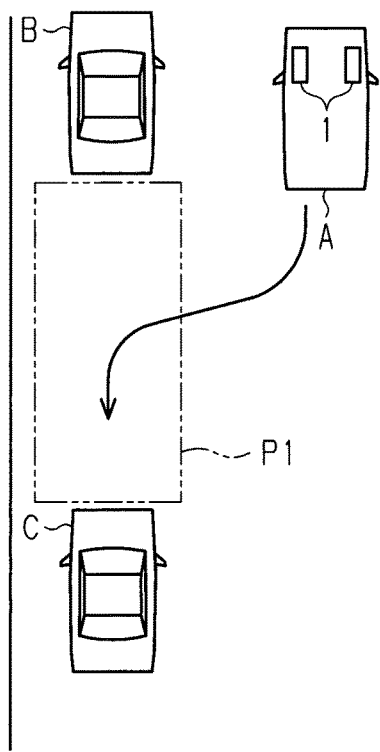
FIG. 3 is a schematic diagram illustrating a parking manner through automatic control of a steering device.
Figure 4:
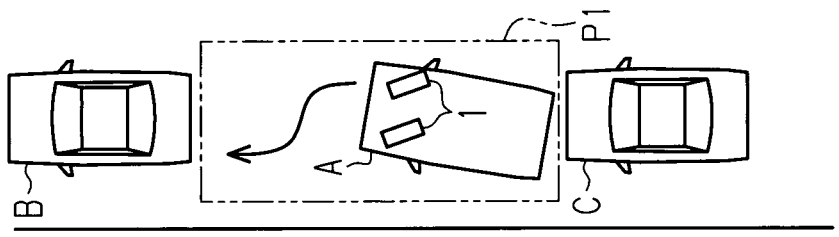
FIG. 4 is another schematic diagram illustrating the parking manner through the automatic control of the steering device.
Figure 5:
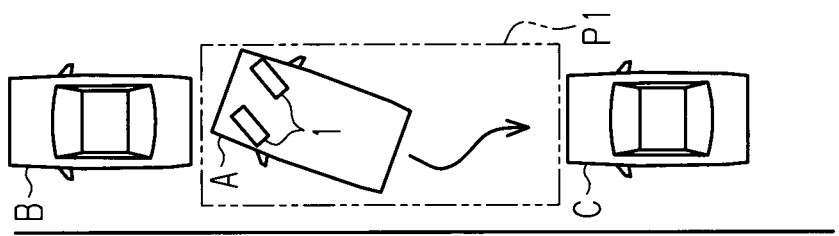
FIG. 5 is another schematic diagram illustrating the parking manner through the automatic control of the steering device.

In the automatic pulling-in control, the steerable wheels 1 are operated through activation of the motor 2*a* of the steering device 2 such that the host vehicle A moves into the parking space P1 as indicated by the arrow in FIG. 3. Then, with the host vehicle A stopped at the position represented in FIG. 4, the steerable wheels 1 are operated through activation of the motor 2*a* until the steerable wheels 1 become oriented maximally leftward as viewed in the drawing (leftward steering). After changing the orientation of the steerable wheels 1 in this manner, the steerable wheels 1 are operated through activation of the motor 2*a* of the steering device 2 such that the host vehicle A moves in the parking space P1 as indicated by the arrow in FIG. 4. Afterwards, with the host vehicle A stopped at the position represented in FIG. 5, the steerable wheels 1 are operated through activation of the motor 2*a* until the steerable wheels 1 become oriented maximally rightward as viewed in the drawing (rightward steering). After changing the orientation of the steerable wheels 1 in this manner, the steerable wheels 1 are operated through activation of the motor 2*a* of the steering device 2 such that the host vehicle A moves in the parking space P1 as indicated by the arrow in FIG. 5.

Figure 6:
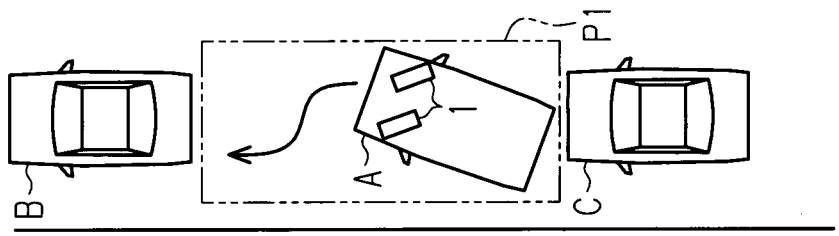
FIG. 6 is another schematic diagram illustrating the parking manner through the automatic control of the steering device.
Figure 7:
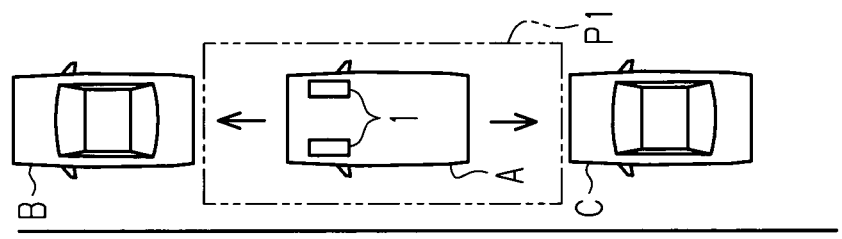
FIG. 7 is another schematic diagram illustrating the parking manner through the automatic control of the steering device.
Figure 8:
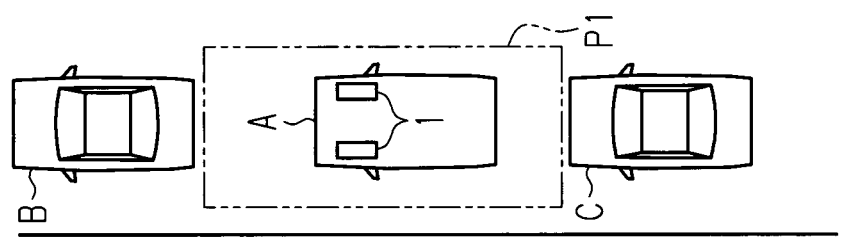
FIG. 8 is another schematic diagram illustrating the parking manner through the automatic control of the steering device.
Figure 9:
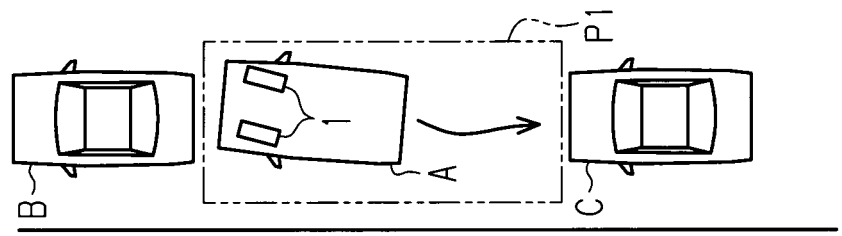
FIG. 9 is a schematic diagram illustrating movement of the host vehicle when the size of a parking area is measured.

Subsequently, with the host vehicle A stopped at the position represented in FIG. 6, the steerable wheels 1 are operated through activation of the motor 2*a* until the steerable wheels 1 become oriented leftward to a certain extent as viewed in the drawing. After changing the orientation of the steerable wheels 1 in this manner, the steerable wheels 1 are operated through activation of the motor 2*a* of the steering device 2 such that the host vehicle A moves in the parking space P1 as indicated by the arrow in FIG. 6. Afterwards, with the host vehicle A stopped at the position represented in FIG. 7, the steerable wheels 1 are operated through activation of the motor 2*a* until the steerable wheels 1 become oriented rightward to a certain extent as viewed in the drawing. After changing the orientation of the steerable wheels 1 in this manner, the steerable wheels 1 are operated through activation of the motor 2*a* of the steering device 2 such that the host vehicle A moves in the parking space P1 as indicated by the arrow in FIG. 7. As a result, as illustrated in FIG. 8, the host vehicle A is moved to and stopped at the parking position in the parking space P1 and parking the host vehicle A in the parking space P1 is thus completed.

In the above-described automatic pulling-in control, the steerable wheels 1 are operated solely through activation of the motor 2*a* of the steering device 2 without steering operation by the driver. This increases the load on the motor 2*a*. In other words, an increased electric current flows in the motor 2*a* of the steering device 2 to activate the motor 2*a*. As a result, when the automatic pulling-in control is performed, the motor 2*a* of the steering device 2 tends to be heated. Further, when an electric current is supplied to the steering device 2 to activate the motor 2*a*, the electric current flows not only in the motor 2*a* but also in a control unit (ECU) for controlling the motor 2a. The ECU is thus also heated in the same manner as the motor 2a when the motor 2a is heated. The amount of temperature increase of the steering device 2 caused by execution of the automatic control becomes particularly great when operation for changing the orientation of the steerable wheels 1 (reversal of the steering direction) through activation of the motor 2a is performed with the host vehicle A maintained in a stopped state. Specifically, the load of the motor 2a is greater and thus tends to become more heated when the operation for changing the orientation of the steerable wheels 1 through activation of the motor 2a is performed with the host vehicle A maintained in a stopped state than when the operation for changing the orientation of the steerable wheels 1 through activation of the motor 2a is executed with the host vehicle A in a running state.

[Pulling-Out Assist]

When the pulling-out assist is started, the electronic control unit 9 instructs the driver to perform the measurement starting operation as preparation for the size measurement of the parking space through display on the display panel 3 and sound from the speaker 4. For example, with the host vehicle A maintained in the parking space P1 as represented by the solid lines in FIG. 9, the driver is instructed to release the brake pedal 14 with the shift lever 10 (FIG. 1) at the drive position.

On condition that the driver has accomplished the above-described measurement starting operation, the electronic control unit 9 performs the measurement procedure for measuring the size of the parking space P1 (FIG. 9) using the clearance sonars 5, 7 and the ultrasonic sensors 6, 8. In the measurement procedure, the electronic control unit 9 operates to move the host vehicle A reciprocally in the front-rear direction in such a range that the host vehicle A does not contact obstacles such as the vehicles B, C as indicated by the arrows in FIG. 9, while monitoring signals from the clearance sonars 5, 7 and the ultrasonic sensors 6, 8, which are illustrated in FIG. 1. Also, when performing the aforementioned reciprocal movement, the electronic control unit 9 monitors signals from the clearance sonars 5, 7, the ultrasonic sensors 6, 8, the vehicle wheel speed sensor 16, the angle sensor 17, and the yaw rate sensor 19. Based on the signals from these sensors, the electronic control unit 9 obtains the size of the parking space P1 and the position of the host vehicle A relative to the parking space P1.

Then, based on the size of the parking space P1, or, more specifically, based on the margin of the size of the parking space P1 in relation to the size of the host vehicle A, the electronic control unit 9 obtains the path for pulling out the host vehicle A. The electronic control unit 9 then instructs the driver to manipulate the accelerator pedal 12, the brake pedal 14, and the shift lever 10 such that the host vehicle A moves along the path obtained in the above-described manner. The electronic control unit 9 also performs the automatic control of the steering device 2 (the motor 2a), in correspondence with manipulation by the driver according to instructions. The automatic control operates the steerable wheels 1 to move the host vehicle A along the aforementioned path solely through activation of the motor 2a of the steering device 2, without steering operation by the driver. In this manner, the host vehicle A is assisted to be pulled out of the parking space P1. In such assist for the host vehicle A to pull the host vehicle A out of the parking space P1, not only the steering device 2 is automatically operated, as has been described, but also drive force adjustment, brake actuation, and shift position change of the host vehicle A for moving the host vehicle A along the aforementioned path may be automatically performed.

In the automatic control for moving the host vehicle A along the aforementioned path, the motor 2a is activated to operate the steerable wheels 1 in the manner opposite to the manner illustrated in FIGS. 3 to 8 in which the steerable wheels 1 are operated such that the host vehicle A is pulled into the parking space P1. Also in the automatic control of the steering device 2, the steerable wheels 1 are operated solely through activation of the motor 2a of the steering device 2 without steering operation by the driver, as in the above-described automatic control for pulling-in. The load on the motor 2a is thus increased. As a result, when the automatic control for pulling out is performed, the motor 2a and the ECU of the steering device 2 tend to become heated. The temperature increase amount of the motor 2a and that of the ECU increase particularly when operation for changing the orientation of the steerable wheels 1 through activation of the motor 2a is performed with the host vehicle A maintained in a stopped state in the automatic control for pulling out.

To maintain the temperatures of the motor 2a and the ECU of the steering device 2 each at a sufficiently low value, the automatic control may be prohibited if the temperature of the motor 2a is higher than or equal to a determination value before the automatic control is started. In this case, setting the aforementioned determination value to a low value enables reliable prohibition of the automatic control even under the least favorable condition in terms of temperature increase of the motor 2a and the ECU caused by the automatic control. However, since the low determination value restricts the executing condition for the automatic control, decrease of the frequency of execution of the automatic control is inevitable.

Alternatively, while the determination value is set to a high value to increase the execution frequency of the automatic control, the temperature of the motor 2a may be monitored after the automatic control is started. In this case, if the temperature of the motor 2a cannot be maintained at a sufficiently low value, the automatic control may be stopped without completion to prevent temperature increase of the motor 2a and the ECU. However, if and after the automatic control is stopped before completion, the driver must manually operate the steering wheel to continuously pull the host vehicle A into or out of the parking space P1, which may be troublesome for the driver. Further, if the driver is not sufficiently skilled, the vehicle may not be properly pulled into or out of the parking space P1.

To solve the above-described problem, the parking assist device of the present embodiment performs the procedure described below through an electronic control unit 9 functioning as a controller when executing the automatic control of the steering device 2.

That is, if, as a path for pulling the host vehicle A into or out of the parking space P1, there is a path in which the predicted temperature Tf of the steering device 2 (the motor 2a) for when the automatic control is performed to move the host vehicle A along the path is maintained lower than the allowable upper limit value Tm, the automatic control is started to move the host vehicle A along the path. In contrast, if there is not such a path that the predicted temperature Tf is maintained lower than the allowable upper limit value Tm, the automatic control is prohibited. These procedures are accomplished by performing the procedures (D1), (D2), and (D3), as will be described.

(D1) A candidate path for pulling the host vehicle A into or out of the parking space P1 is obtained. Specifically, the candidate path is obtained based on the size of the parking space P1 (which is, specifically, the margin of the size of the parking space P1 relative to the size of the host vehicle A).

(D2) The predicted temperature Tf of the steering device 2 (the motor 2a) is obtained for when the automatic control is performed to move the host vehicle A along the candidate path obtained in (D1). Specifically, the temperature change amount ΔT of the motor 2a for when the aforementioned automatic control is performed is obtained first. Then, the temperature change amount ΔT is added to the current temperature T of the motor 2a to obtain the predicted temperature Tf. The temperature change amount ΔT is obtained based on the traveling distance of the host vehicle A, the number of times of reversal of the steering direction of the host vehicle A, and the manner in which the steering ratio of the host vehicle A is changed when the host vehicle A is moved along the candidate path.

(D3) A determination is made as to whether the predicted temperature Tf obtained in (D2) is lower than the allowable upper limit value Tm. If the predicted temperature Tf is lower than the allowable upper limit value Tm, the automatic control is started to move the host vehicle A along the path. In contrast, if the predicted temperature Tf is higher than or equal to the allowable upper limit value Tm, the automatic control is prohibited.

Operation of the parking assist device will hereafter be described.

When the automatic control is performed, the procedures (D1) to (D3) are executed through the electronic control unit 9. This ensures avoidance of start of the automatic control in a state in which the temperature of the steering device 2 (the motor 2a) is likely to be high, or, in other words, higher than or equal to the allowable upper limit value Tm. If the automatic control is started in the aforementioned state, the temperature of the steering device 2 may increase to a value greater than or equal to the allowable upper limit value Tm during execution of the automatic control. In this case, to avoid such temperature increase, the automatic control in execution may have to be stopped. However, the automatic control is prohibited from being started in the aforementioned state. This ensures avoidance of suspension of the automatic control due to temperature increase of the steering device during execution of the automatic control. Further, if there is a path in which the predicted temperature Tf will be maintained lower than the allowable upper limit value Tm, the path is implemented as a candidate and the automatic control is started to move the host vehicle A along that path. This increases the frequency of execution of the automatic control as much as possible.

Figure 10:
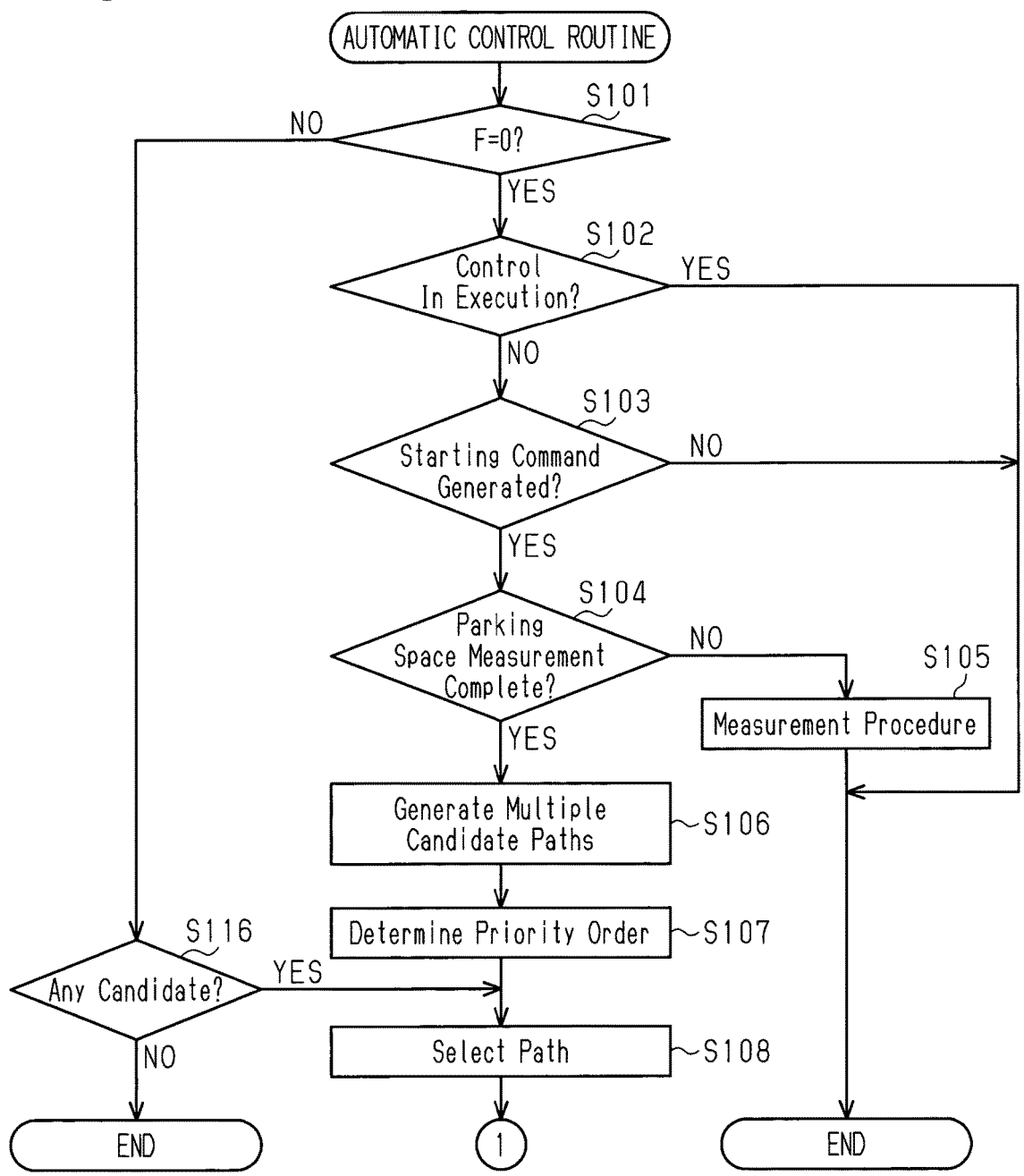
FIG. 10 is a flowchart representing a procedure for selectively prohibiting and starting the automatic control.
Figures 11, 12:
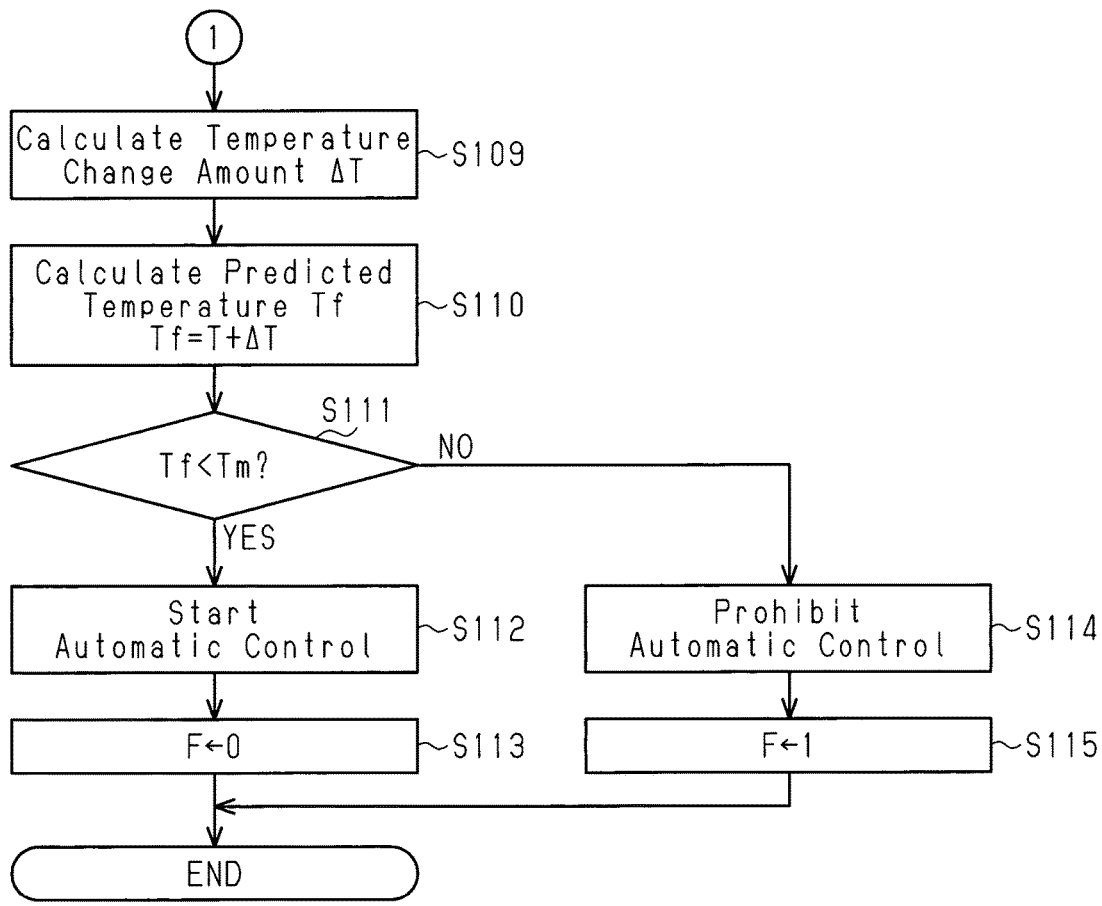
FIG. 11 is a flowchart representing the procedure for selectively prohibiting and starting the automatic control.
FIG. 12 is a table representing the number of times of reversal of the steering direction and changes in the steering ratio in a path K1.

FIGS. 10 and 11 are flowcharts representing an automatic control routine for selectively prohibiting and starting the automatic control based on the predicted temperature Tf when the automatic control is performed. The automatic control routine is performed through the electronic control unit 9 periodically in an interrupting manner at predetermined time intervals, for example.

As Step 101 (S101 of FIG. 10) of the routine, the electronic control unit 9 determines whether the flag F, with reference to which a determination is made as to whether the automatic control is currently prohibited, is 0 (which indicates that the automatic control is not currently prohibited). If a positive determination is made in this step, S102 is performed. As the procedure of S102, the electronic control unit 9 determines whether the automatic control is currently in execution. If a positive determination is made in this step, the electronic control unit 9 stops the automatic control routine. If a negative determination is made, S103 is performed. As S103, the control unit 9 determines whether a command for starting pulling-in or pulling-out assist has been generated. The command for starting the pulling-in or pulling-out assist is generated through manipulation of the display panel 3 by the driver for starting the pulling-in or pulling-out assist. When a negative determination is made in S103, the electronic control unit 9 stops the automatic control routine. If a positive determination is made in S103, the electronic control unit 9 performs S104.

As S104, the electronic control unit 9 determines whether size measurement of the parking space P1 has been complete. If a negative determination is made in this step, S105 is performed. As S105, the electronic control unit 9 executes a measurement procedure for measuring the size of the parking space P1. Specifically, on condition that the driver has accomplished the measurement starting operation for the pulling-in or pulling-out assist, the electronic control unit 9 performs the aforementioned measurement procedure to measure the size of the parking space P1 through the measurement procedure. After the size measurement of the parking space P1 is completed through the measurement procedure in the above-described manner, a positive determination is made in S104 and S106 is performed. In the procedures of S106 and its subsequent steps, S106 to S108 of FIG. 10 correspond to the procedure of (D1). S109 and S110 of FIG. 11 correspond to the procedure of (D2). S111 to S115 of FIG. 11 correspond to the procedure of (D3).

As S106 (FIG. 10), the electronic control unit 9 obtains a plurality of candidate paths each as a candidate path for pulling the host vehicle A into or out of the parking space P1 by taking into account the size of the parking space P1 and the size of the host vehicle A. Then, as S107, the electronic control unit 9 determines the order of priority of the candidate paths obtained in S107. Subsequently, as S108, which is the subsequent step, the electronic control unit 9 selects the candidate path with the top priority as the path for pulling the host vehicle A into or out of the parking space P1, out of the candidate paths.

Then, as S109 (FIG. 11), the electronic control unit 9 calculates the temperature change amount ΔT of the steering device 2 (the motor 2a) for when the automatic control is performed to move the host vehicle A along the selected path. The temperature change amount ΔT is calculated based on the traveling distance of the host vehicle A, the number of times of reversal of the steering direction, and the manner in which the steering ratio is changed when the automatic control is performed to move the host vehicle A along the aforementioned path. The steering ratio of the host vehicle A is a value representing the degree to which the steerable wheels 1 are steered rightward or leftward with respect to the position (the neutral position) of the steerable wheels 1 for advancing the host vehicle A straightly ahead. The steering ratio is 0% when the steerable wheels 1 are at the neutral position. The more steered rightward or leftward the steerable wheel 1 with respect to the neutral position, the closer to 100% the steering ratio becomes. Then, as S110, by adding the temperature change amount ΔT to the current temperature T of the motor 2a, the electronic control unit 9 calculates the predicted temperature Tf of the steering device 2 (the motor 2a) for when the automatic control is performed to move the host vehicle A along the selected path.

Subsequently, as S111, the electronic control unit 9 determines whether the predicted temperature Tf is lower than the allowable upper limit value Tm. If a positive determination is made in this step, the electronic control unit 9 starts the automatic control as S112. Then, as S113, the electronic control unit 9 sets the flag F to 0 and suspends the automatic control routine. In contrast, if a negative determination is made in S111, the electronic control unit 9 prohibits the automatic control as S114. Further, as S115, the electronic control unit 9 sets the flag F to 1 (indicating that the automatic control is currently prohibited) and suspends the automatic control routine. After the flag F is set to 1 in this manner, a negative determination is made in S101 (FIG. 10) and S116 is performed. As S116, the electronic control unit 9 determines whether there is any remaining candidate in the candidate paths obtained in S106. If a negative determination is made in S116, the electronic control unit 9 suspends the automatic control routine. If a positive determination is made in S116, the electronic control unit 9 performs S108. At this stage, as S108, the electronic control unit 9 selects the candidate path with the top priority as the path for pulling the host vehicle A into or out of the parking space P1, out of the remaining candidate paths. Subsequently, the electronic control unit 9 executes S109 and its subsequent steps (FIG. 11) in the same manner as in the above-described manner.

If the predicted temperature Tf becomes higher than or equal to the allowable upper limit value Tm for all of the aforementioned candidate paths, the automatic control is maintained in a prohibited state and the flag F is maintained as 1. If the flag F is maintained as 1 in this manner, the flag F is reset to 0, which is the initial value, when the driver turns off the ignition switch, for example, to stop electric power supply to the electronic control unit 9.

The candidate paths obtained in S106 (FIG. 10) and the manner for determining the order of priority of the candidate paths in S107 (FIG. 10) will hereafter be described in detail.

In the present embodiment, in S106, a plurality of candidate paths, such as paths K1, K2, K3, K4, and K5, which will be described later, are obtained by taking into account the size of the parking space P1 and the size of the host vehicle A, each as a candidate path for pulling the host vehicle A into or out of the parking space P1. The paths K1 to K5 will now each be described in detail.

Figures 13, 14:
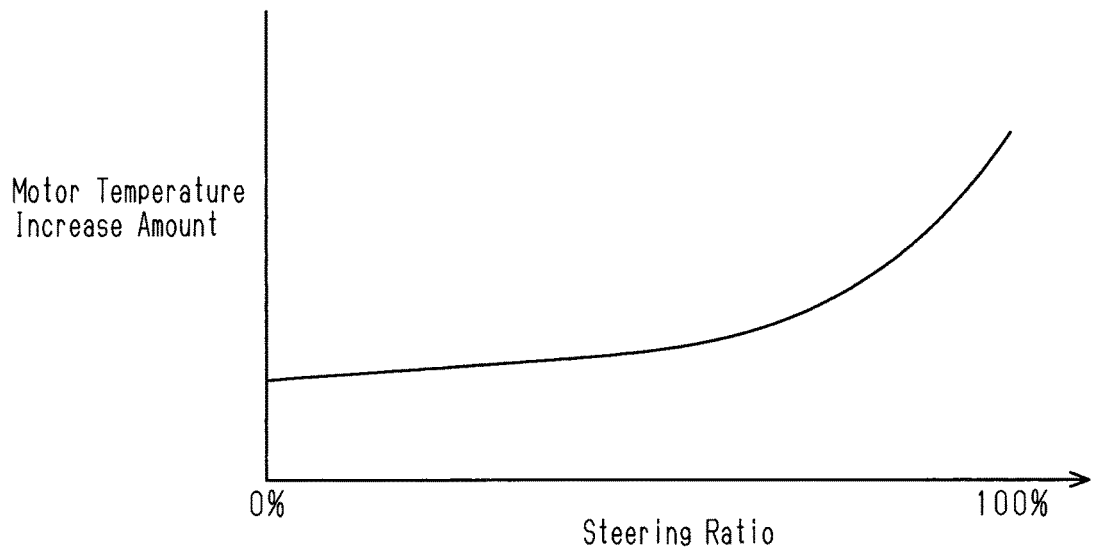
FIG. 13 is a graph representing the relationship between the steering ratio and the temperature increase amount of the motor.
FIG. 14 is a table representing the number of times of reversal of the steering direction and changes in the steering ratio in a path K2.

As represented in FIG. 12, the path K1 is such a path that the number of times of reversal of the steering direction of the host vehicle A is five, for example, and the steering ratio of the host vehicle A is 100% leftward, 100% rightward, 100% leftward, 100% rightward, and Ra % leftward (Ra %<100%) for the first time, the second time, the third time, the fourth time, and the fifth time of the reversal of the steering direction, respectively. FIG. 13 is a graph representing the relationship between the steering ratio and the temperature increase amount of the motor 2a. As is clear from the graph, the closer to 100% the steering ratio for leftward or rightward steering, the higher the temperature increase amount of the motor 2a becomes. The temperature increase amount of the motor 2a becomes significantly high in the range in which the steering ratio is close to 100% in particular.

The path K2 is such a path that, compared to the path K1, the steering ratio of the host vehicle A is decreased as much as possible without increasing the number of times of reversal of the steering direction. As represented in FIG. 14, the number of times of reversal of the steering direction of the host vehicle A along the path K2 is equal to the number of times of reversal of the steering direction along the path K1 (in this example, five times). The steering ratio of the host vehicle A is Rb % leftward (Rb %<100%), Rb % rightward, Rb % leftward, Rb % rightward, and Rc % leftward (Rc %≤Rb %) for the first time, the second time, the third time, the fourth time, and the fifth time of reversal of the steering direction, respectively.

The path K3 is such that, compared to the path K1, the steering ratio of the host vehicle A when the steering wheel is turned is further decreased by increasing the number of times of reversal of the steering direction of the host vehicle A. As represented in FIG. 15, the number of times of reversal of the steering direction of the host vehicle A along the path K3 is greater than the number of times of reversal of the steering direction along the path K1 (for example, seven times). The steering ratio of the host vehicle A is Rd % leftward (Rd %<Rb %), Rd % rightward, Rd % leftward, Rd % rightward, Rd % leftward, Rd % rightward, and Re % leftward (Re %≤Rd %) for the first time, the second time, the third time, the fourth time, the fifth time, the sixth time, and the seventh time of reversal of the steering direction, respectively.

Figure 17:
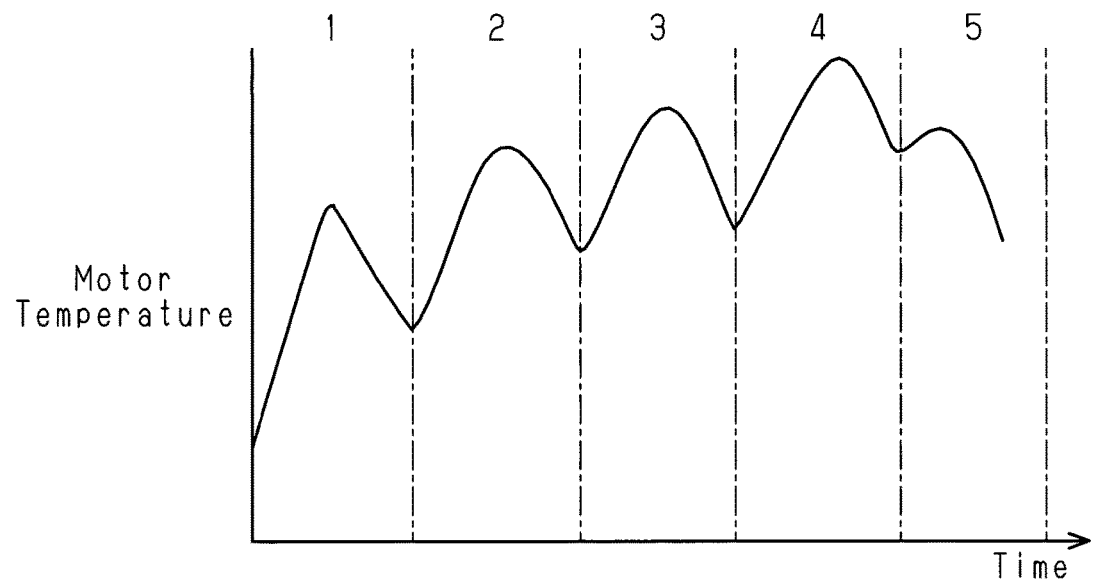
FIG. 17 is a timing diagram representing temperature changes of a motor when automatic control for moving a host vehicle along the path K1 is performed.
Figure 18:
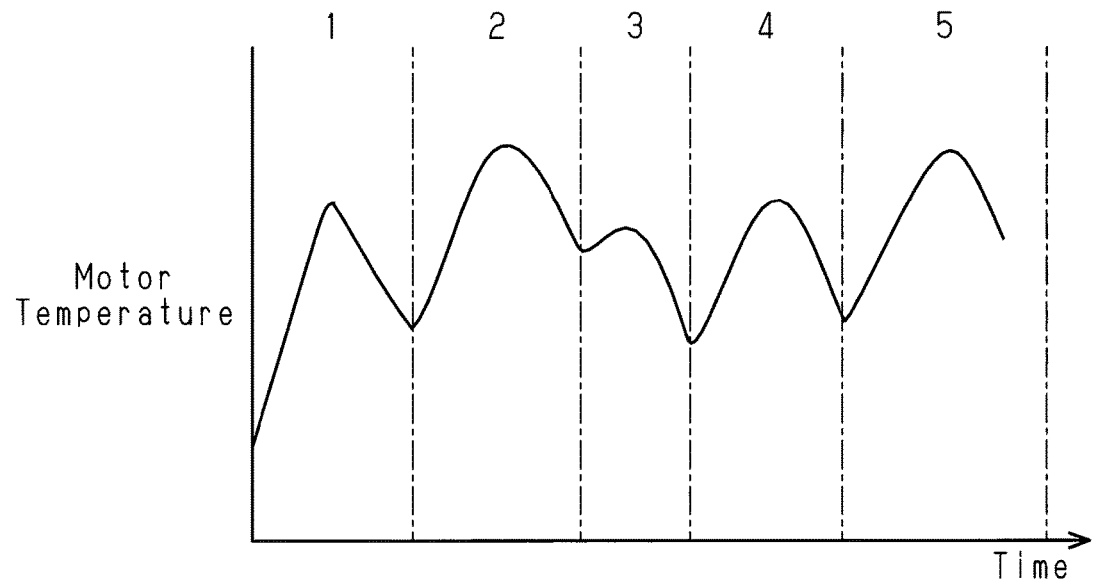
FIG. 18 is a timing diagram representing the temperature changes of the motor when automatic control for moving the host vehicle along the path K4 is performed.

The path K4 is such a path that the number of times of reversal of the steering direction is equal to the number of times of reversal of the steering direction of the path K1 and the steering ratio for a time of reversal of the steering direction between the first and last times of reversal of the steering direction is smaller than the steering ratio for the other times. As represented in FIG. 16, the number of times of reversal of the steering direction of the host vehicle A along the path K4 is equal to the number of times of reversal of the steering direction along the path K1. The steering ratio of the host vehicle A is 100% leftward, 100% rightward, Ra % leftward (Ra %<100%), 100% rightward, and 100% leftward for the first time, the second time, the third time, the fourth time, and the fifth time of reversal of the steering direction, respectively. FIG. 17 represents changes in the temperature of the motor 2a when the automatic control is performed to move the host vehicle A along the path K1. FIG. 18 represents changes in the temperature of the motor 2a when the automatic control is performed to move the host vehicle A along the path K4. As is clear from these graphs, the maximum temperature of the motor 2a in the automatic control is lowered by decreasing the steering ratio for the time of reversal of the steering direction between the first and last times of reversal of the steering direction. This is caused by the fact that, by decreasing the steering ratio for the time of reversal of the steering direction between the first and last times as has been described, heat is released from the motor 2a in the automatic control and thus temperature increase of the temperature of the motor 2a is suppressed.

Figures 19, 20:
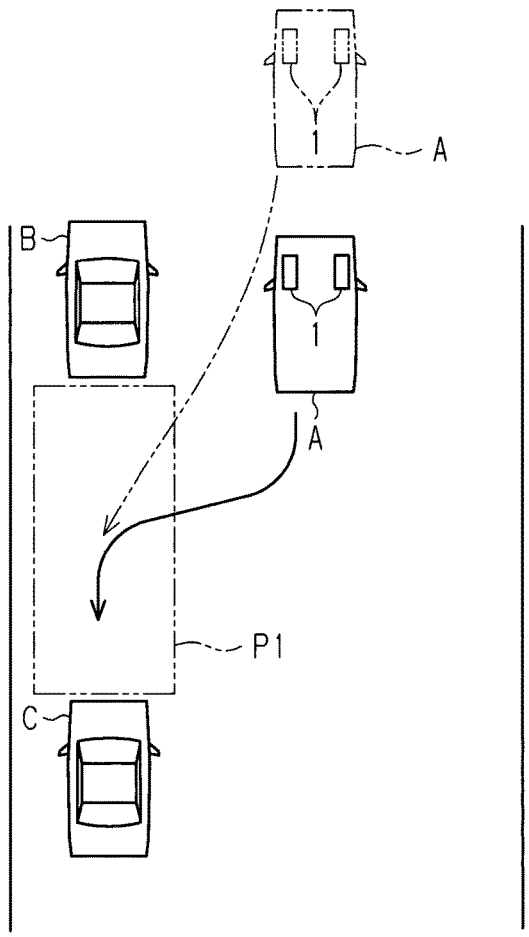
FIG. 19 is a schematic diagram illustrating movement of the host vehicle along the path K5.
FIG. 20 is a table representing the number of times of reversal of the steering direction and changes in the steering ratio in the path K5.

The path K5 is such a path that, compared to the path K2, the steering ratio of the host vehicle A when the steering wheel is turned is decreased as much as possible without increasing the number of times of reversal of the steering direction, by moving the host vehicle A in advance from the position represented by the solid lines in FIG. 19 to the position spaced from the parking space P1 as represented by the broken lines. As represented in FIG. 20, the number of times of reversal of the steering direction of the host vehicle A along the path K5 is equal to the number of times of reversal of the steering direction along the path K2 (in this example, five times). The steering ratio of the host vehicle A is Rf % leftward (Rf %<Rb %), Rf % rightward, Rf % leftward, Rf % rightward, and Rg % leftward (Rg %≤Rf %) for the first time, the second time, the third time, the fourth time, and the fifth time of reversal of the steering direction, respectively. Although the path K5 increases the traveling distance of the host vehicle A, the steering ratio of the host vehicle A when the steering wheel is turned is further decreased compared to that of the path K2.

In the present embodiment, the order of priority is determined for the candidate paths, which are the paths K1 to K5, in the manner described below, for example, in the above-described procedure of S107 (FIG. 10). That is, the order of priority is determined for the paths K1 to K5 in accordance with the ascending order of the traveling distance of the host vehicle A. For those of the paths K1 to K5 having equal traveling distances of the host vehicle A, a higher order of priority is given to one with a smaller maximum or average steering ratio of the host vehicle A. After determining the order of priority for the candidate paths, which are the paths K1 to K5, a path for pulling the host vehicle A into or out of the parking space P1 is selected from the candidate paths in accordance with the order of priority.

The present embodiment as described above has the following advantages.

(1) Before performing the automatic control of the steering device 2 through which the host vehicle A is assisted to be pulled into or out of the parking space P1, the above-described procedures (D1) to (D3) are performed through the electronic control unit 9. If it is determined, through the procedures (D1) to (D3), that there is a path in which the predicted temperature Tf of the steering device 2 (the motor 2a) for when the automatic control is performed to move the host vehicle A along the path is maintained lower than the allowable upper limit value Tm, the automatic control is started to move the host vehicle A along the path. In contrast, when there is no such a path that the predicted temperature Tf is maintained lower than the allowable upper limit value Tm, the automatic control is prohibited. This ensures avoidance of start of the automatic control in a state in which the temperature of the steering device 2 (the motor 2a) is likely to become high, or, in other words, higher than or equal to the allowable upper limit value Tm during execution of the automatic control. If the automatic control is started in the aforementioned state, the temperature of the steering device 2 may increase to a value higher than or equal to the allowable upper limit value Tm during execution of the automatic control. In this case, to avoid such temperature increase, the automatic control in execution may have to be stopped. However, the automatic control is prohibited from staring in the aforementioned state, thus ensuring avoidance of suspension of the automatic control due to temperature increase of the steering device during execution of the automatic control. Further, if there is a path in which the predicted temperature Tf is maintained lower than the allowable upper limit value Tm, the path is selected as a candidate and the automatic control is started to move the host vehicle A along the path. This increases the frequency of execution of the automatic control as much as possible.

(2) The automatic control of the steering device 2 is selectively prohibited and started through the procedures (D1) to (D3) in the manner described below. That is, multiple candidate paths are obtained each as a path for pulling the host vehicle A into or out of the parking space P1. Then, the predicted temperature Tf of the steering device 2 (the motor 2a) is calculated sequentially for respective cases in which the automatic control of the steering device 2 is performed to move the host vehicle A along the obtained paths. When the predicted temperature Tf is higher than or equal to the allowable upper limit value Tm, the automatic control is prohibited. In contrast, when the predicted temperature Tf is lower than the allowable upper limit value Tm, the automatic control is started to move the host vehicle A along the path corresponding to this predicted temperature Tf. As a result, when any one of the candidate paths is capable of maintaining the predicted temperature Tf lower than the allowable upper limit value Tm, the automatic control is started to move the host vehicle A along that path. This increases the frequency of execution of the automatic control as much as possible.

(3) As has been described, to obtain the candidate paths each as a path for pulling the host vehicle A into or out of the parking space P1, paths having different traveling distances, different numbers of times of reversal of the steering direction, and manners in which the steering ratio is changed are obtained as the candidate paths. The predicted temperature Tf of the steering device 2 (the motor 2a) for when the automatic control is performed to move the host vehicle A along a certain path is influenced by the traveling distance of the host vehicle A, the number of times of reversal of the steering direction of the host vehicle A, and the manner in which the steering ratio of the host vehicle A is changed corresponding to the path. Therefore, by obtaining the paths having different traveling distances, different numbers of times of reversal of the steering direction, and different manners in which the steering ratio is changed, the number of the candidate paths is increased to increase the likelihood that a path in which the predicted temperature Tf is maintained lower than the allowable upper limit value Tm will be obtained. This increases the frequency of execution of the automatic control as much as possible.

Second Embodiment

A parking assist device according to a second embodiment will now be described with reference to FIGS. 21 and 22.

Figure 21:
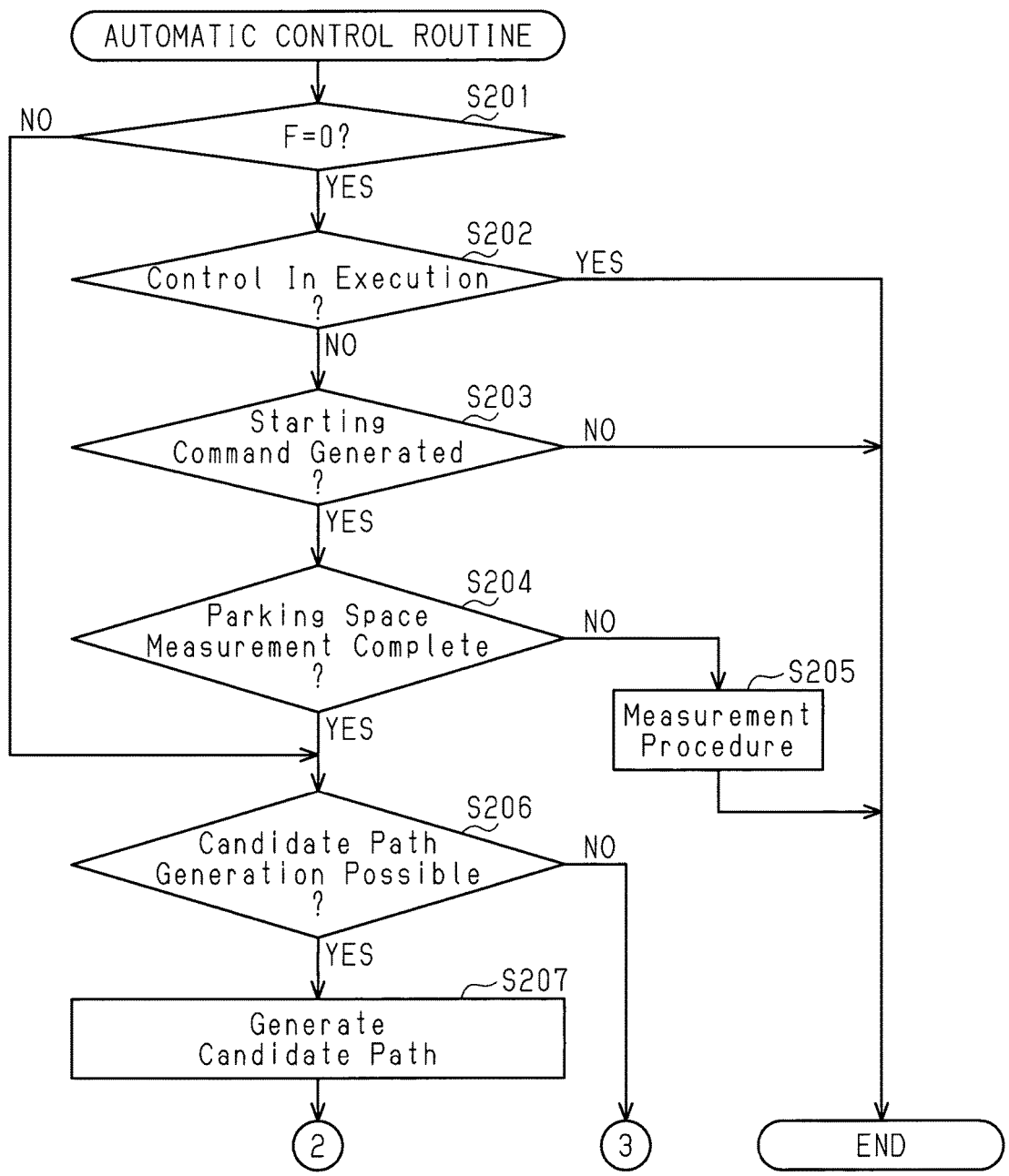
FIG. 21 is a flowchart representing a procedure for selectively prohibiting and starting the automatic control.
Figure 22:
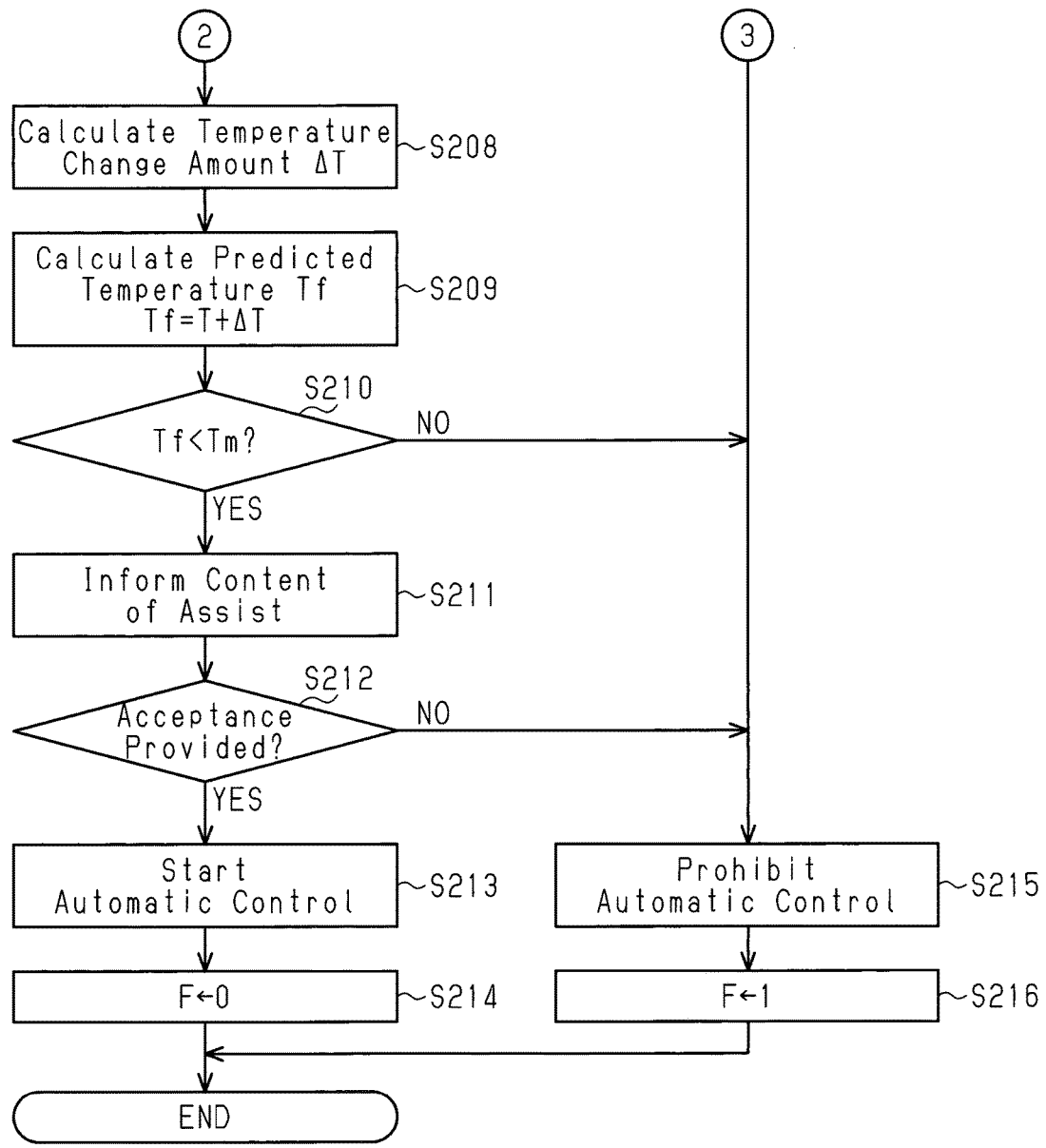
FIG. 22 is a flowchart representing the procedure for selectively prohibiting and starting the automatic control.
Figure 23:
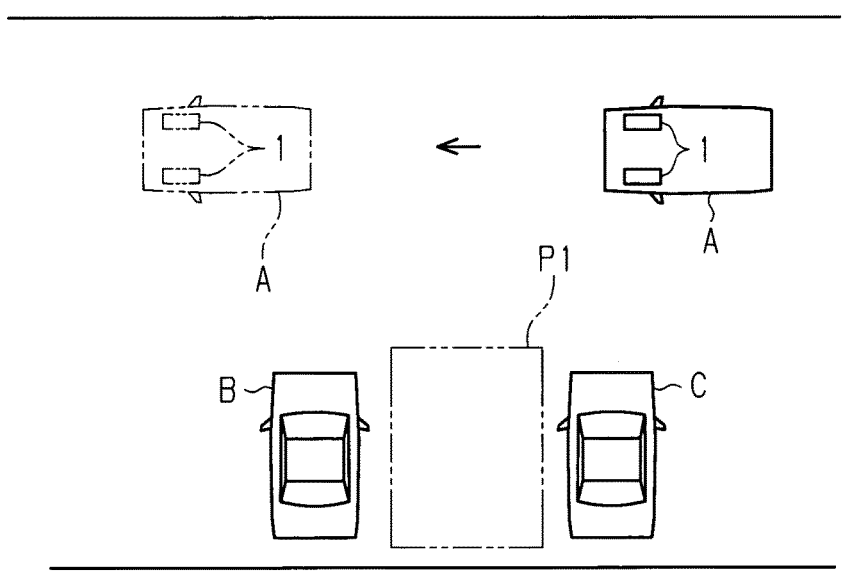
FIG. 23 is a schematic diagram illustrating movement of the host vehicle when the size of a parking area is measured.

FIGS. 21 and 22 are flowcharts representing an automatic control routine according to the present embodiment. The automatic control routine is performed through the electronic control unit 9 periodically in an interrupting manner at predetermined time intervals, for example.

As Step 201 (FIG. 21), the electronic control unit 9 determines whether the flag F is 0. If a positive determination is made in this step, S202 is performed. If a negative determination is made in the step, S206 is performed. As S202, the electronic control unit 9 determines whether the automatic control is being executed. As S203, the electronic control unit 9 determines whether a command for starting pulling-in or pulling-out assist has been generated. If a negative determination is made in either S202 or S203, the electronic control unit 9 suspends the automatic control routine. When a positive determination is made in both S202 and S203, the electronic control unit 9 performs S204. As S204, the electronic control unit 9 determines whether size measurement of the parking space P1 is complete. If a negative determination is made in this step, the electronic control unit 9 executes S205 to perform the measurement procedure for measuring the size of the parking space P1. In contrast, when a positive determination is made in S204, S206 is performed. In S206 and its subsequent steps, S206 and S207 of FIG. 21 correspond to (D1). S208 and S209 of FIG. 22 correspond to the procedure of (D2). S210 to S216 of FIG. 22 correspond to the procedure of (D3).

As S206 (FIG. 21), the electronic control unit 9 determines whether a candidate path for pulling the host vehicle A into or out of the parking space P1 can be obtained. If a positive determination is made in this step, the electronic control unit 9, as S207, determines a single candidate path by taking into account the size of the parking space P1 and the size of the host vehicle A. For example, any one of a plurality of candidate paths, such as the paths K1 to K5 of the first embodiment, may be obtained. It is preferable that the single candidate path, which is obtained in this step, be the one with the top priority of those selectable from the aforementioned candidate paths. In the second embodiment, the candidate paths include not only the paths K1 to K5 but also paths that may fail to provide assist in steering operation by the driver through the motor 2a due to restricted activation of the motor 2a caused by temperature increase after the automatic control is ended and paths that can be implemented through the automatic control assisted by steering operation by the driver.

As S208 (FIG. 22), the electronic control unit 9 calculates the temperature change amount ΔT of the steering device 2 (the motor 2a) for when the automatic control is performed to move the host vehicle A along the obtained path. The temperature change amount ΔT is calculated based on the traveling distance, the number of times of reversal of the steering direction, and the manner in which the steering ratio is changed when the automatic control is executed to move the host vehicle A along the path. As S209, which is the subsequent step, the electronic control unit 9 adds the temperature change amount ΔT to the current temperature T of the motor 2a to calculate the predicted temperature Tf of the steering device 2 (the motor 2a) for when the automatic control is performed to move the host vehicle A along the path.

Then, as S210, the electronic control unit 9 determines whether the predicted temperature Tf is lower than the allowable upper limit value Tm. If a negative determination is made in this step, the electronic control unit 9 prohibits the automatic control as S215. Further, the electronic control unit 9 sets the flag F to 1 (indicating that the automatic control is currently prohibited) as S216 and then suspends the automatic control routine. In contrast, when a positive determination is made in Step S210, the electronic control unit 9, as S211, informs the driver of the content of pulling-in or pulling-out assist for the host vehicle A with respect to the parking space P1 through the automatic control performed to move the host vehicle A along the path. The content of such assist may be notified in, for example, the manner described below.

If the obtained path has the top priority in those selectable from the candidate paths, the driver is notified of that information through illumination of a blue lamp on the display panel 3, for example.

If the obtained path has a second or lower priority in those selectable from the candidate paths, the driver is notified of that information through illumination of an orange lamp on the display panel 3, for example.

If the obtained path has a second or lower priority in those selectable from the candidate paths and is likely to fail to provide assist in steering operation by the driver through the motor 2a due to restricted activation of the motor 2a caused by temperature increase after the automatic control is ended, the driver is notified of that information through display on the display panel 3 and using sound from the speaker 4.

If the obtained path has a second or lower priority of those selectable from the candidate paths and can be implemented through the automatic control assisted by steering operation by the driver, the driver is notified of that information through display on the display panel 3 and using sound from the speaker 4.

As well as notifying the driver of the information of assist in the above-described manners, the electronic control unit 9 displays an acceptance button on the display panel 3 to confirm the intention of the driver regarding the information. By touching the acceptance button on the display panel 3 within a predetermined time after the acceptance button is displayed, the driver is allowed to express the intention to accept the information of assist notified in any of the above-described manners. After notifying the driver of the information of assist in any of the above-described manners, the electronic control unit 9, as S212, determines whether the driver has accepted the information of assist, or, specifically, the driver touches the acceptance button within the predetermined time after the acceptance button is displayed.

If a positive determination is made in S212, the electronic control unit 9 starts the automatic control as S213. If the path along which the host vehicle A is moved through the automatic control is a path that can be implemented through the automatic control assisted by steering operation by the driver, the electronic control unit 9 first instructs the driver to perform steering operation for assisting in the automatic control through display on the display panel 3 or using sound from the speaker 4. After the driver accomplishes the steering operation for assisting in the automatic control, the automatic control of the steering device 2 is performed to move the host vehicle A along the path. After the automatic control is started, the electronic control unit 9 sets the flag F to 0 as S214 and then suspends the automatic control routine. In contrast, when a negative determination is made in S212, the electronic control unit 9 prohibits the automatic control as S215 and then sets the flag F to 1 as S216.

When the flag F is set to 1, a negative determination is made in S201 (FIG. 21) and S206 is performed. If a positive determination is made in S206, the electronic control unit 9 determines another single candidate path for pulling the host vehicle A into or out of the parking space P1 in S207, which is the subsequent step. For example, the electronic control unit 9 determines the one with the top priority of those remaining of the candidate paths as the other candidate. Afterwards, the electronic control unit 9 performs S208 (FIG. 22) and its subsequent steps in the same manner as in the above-described manner.

If the candidate paths are obtained one by one and the predicted temperature Tf is higher than or equal to the allowable upper limit value Tm for all of the candidate paths, which have been obtained one by one, or, in other words, negative determinations are continuously made in S210 (FIG. 22) until a negative determination is made in S206 (FIG. 21), the automatic control is maintained in a prohibited state and the flag F is maintained as 1. Also, if the driver does not accept assist through the automatic control to pull the vehicle into or out of the parking space along the paths of any of the candidate paths, which have been obtained one by one, or, in other words, negative determinations are continuously made in S212, the automatic control is maintained in a prohibited state and the flag F is maintained as 1. If the flag F is maintained as 1 in this manner, the flag F is reset to 0, which is the initial value, when electric power supply to the electronic control unit 9 is stopped by the driver by turning off the ignition switch of the host vehicle A, for example.

The present embodiment has the following advantages in addition to the advantages (1) to (3) of the first embodiment.

(4) The automatic control of the steering device 2 is selectively prohibited and started through the procedures (D1) to (D3) in the manner described below. That is, after the automatic control is prohibited, another candidate path for pulling the host vehicle A into or out of the parking space P1 is obtained. The automatic control is prohibited if the predicted temperature Tf of the steering device 2 (the motor 2a) for when the automatic control is performed to move the host vehicle A along the obtained path is higher than or equal to the allowable upper limit value Tm. In contrast, the automatic control is started when the predicted temperature Tf is lower than the allowable upper limit value Tm. Therefore, after the automatic control is prohibited, as many other candidate paths as possible are obtained continuously until a path in which the predicted temperature Tf is maintained lower than the allowable upper limit value Tm is obtained. When the path in which the predicted temperature Tf is maintained lower than the allowable upper limit value Tm is obtained, the automatic control is started to move the host vehicle A along the path. This increases the frequency of execution of the automatic control as much as possible.

(5) The candidate paths include not only the paths K1 to K5, which can be implemented without needing steering operation by the driver, but also paths that may fail to provide assist in steering operation by the driver through the motor 2a due to restricted activation of the motor 2a caused by temperature increase after the automatic control is ended and paths that can be implemented through the automatic control assisted by the steering operation by the driver. This further increases the number of obtained candidate paths, thus increasing the likelihood that a path in which the predicted temperature Tf is maintained lower than the allowable upper limit value Tm will be obtained. The frequency of execution of the automatic control is thus increased as much as possible.

(6) Before the automatic control is started to move the host vehicle A along an obtained path, the driver is notified of the content of assist for the host vehicle A to be pulled into or out of the parking space P1 through the automatic control. If a different path is selected to move the host vehicle A each time the automatic control is started, which may cause discomfort to the driver, the driver may stop the automatic control due to the discomfort. However, as has been described, the driver is notified of the content of assist by the automatic control to pull the vehicle into or out of the parking space. This restrains the driver from stopping the automatic control due to discomfort caused by movement of the host vehicle A after the automatic control is started.

Third Embodiment

A parking assist device according to a third embodiment will now be described with reference to FIGS. 23 to 27.

The host vehicle A may be pulled into or out of the parking space P1 not only in a state in which the host vehicle A is parked between other vehicles in the front-and-rear direction of the host vehicle A (a parallel parking state) but also in other states. For example, the host vehicle A may be pulled into or out of the parking space P1 in a state in which the parking space P1 of the host vehicle A is located between other vehicles B and C in the width direction of the host vehicle A (a perpendicular parking state).

In this case, when the pulling-in assist is started by the parking assist device, the electronic control unit 9 provides an instruction to the driver to perform the measurement starting operation as preparation for size measurement of the parking space P1 in the manner described below. That is, the driver is instructed to stop the host vehicle A in a front-facing state at the position represented by the solid lines in FIG. 16, which is the position in front of the parking space P1 between the other vehicles B and C at which the host vehicle A is located immediately before reaching the zone corresponding to the parking space P1 after advancing toward the parking space P1. Then, with the host vehicle A stopped at the position, the driver is instructed to release the brake pedal 14 with the shift lever 10 at the drive position. On condition that the driver has accomplished the above-described measurement starting operation, the electronic control unit 9 performs the measurement procedure for measuring the size of the parking space P1. In the measurement procedure, the host vehicle A is moved from the position represented by the solid lines to the position represented by the long dashed double-short dashed lines, which is the position at which the host vehicle A is located immediately after passing the zone beside the parking space P1. While the host vehicle A is moved from the position represented by the solid lines to the position represented by the long dashed double-short dashed lines, the electronic control unit 9 monitors signals from the clearance sonars 5, 7, the ultrasonic sensors 6, 8, the vehicle wheel speed sensor 16, the angle sensor 17, and the yaw rate sensor 19. Then, based on the signals from these sensors, the electronic control unit 9 obtains the size of the parking space P1 and the position of the host vehicle A relative to the parking space P1.

Then, based on the size of the parking space P1 (which is, specifically, the difference between the size of the parking space P1 and the size of the host vehicle A), the electronic control unit 9 determines a candidate path for pulling the host vehicle A into or out of the parking space P1 through the automatic control. The candidate path, which is obtained in this manner, may be, for example, any one of the paths represented in FIGS. 24 to 26.

Figure 24:
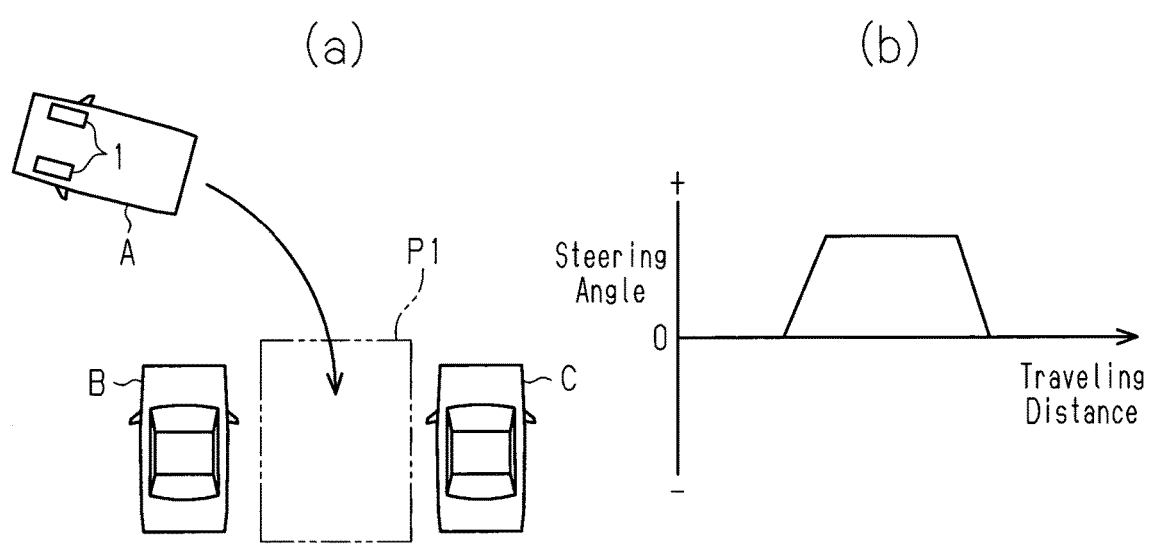
FIG. 24 includes a diagram illustrating a candidate path for pulling the host vehicle into the parking space through the automatic control and a graph representing the relationship between increase of the traveling distance of the host vehicle and changes in the steering angle when the host vehicle is moved along the path.

In FIG. 24, section (a) represents a path for pulling the host vehicle A into the parking space P1 through a single advancing or reversing maneuver (in this example, reversing maneuver) of the host vehicle A. Section (b) represents the relationship between increase of the traveling distance and changes in the steering angle of the host vehicle A when the host vehicle A is moved along the path represented in section (a). The steering angle of FIG. 24 is 0 when the steerable wheels 1 are arranged each at the neutral position. The more leftward the steerable wheels 1 are steered from the neutral position, the greater in the positive side the steering angle becomes. In contrast, the more rightward the steerable wheels 1 are steered from the neutral position, the greater in the negative side the steering angle becomes. As is clear from FIG. 24, in the illustrated case, reversal between rightward steering and leftward steering does not occur in the single reversing maneuver for pulling the host vehicle A into the parking space. This path decreases the traveling distance of the host vehicle A when the host vehicle A is pulled into the parking space and restrains discomfort caused to the driver by the reversal between rightward steering and leftward steering in the single reversing maneuver.

Figure 25:
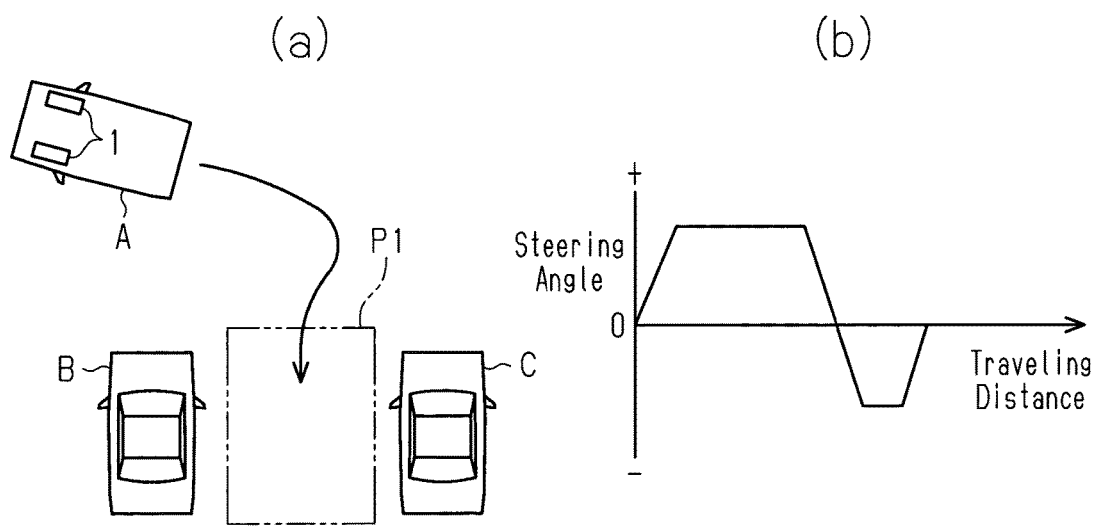
FIG. 25 includes a diagram illustrating another candidate path for pulling the host vehicle into the parking space through the automatic control and a graph representing the relationship between increase of the traveling distance of the host vehicle and changes in the steering angle when the host vehicle is moved along the path.

In FIG. 25, section (a) represents a path for pulling the host vehicle A into the parking space P1 through a single advancing or reversing maneuver (in this example, reversing maneuver) of the host vehicle A. Section (b) represents the relationship between increase of the traveling distance and changes in the steering angle of the host vehicle A when the host vehicle A is moved along the path represented in section (a). As is clear from FIG. 25, in the illustrated case, reversal between rightward steering and leftward steering occurs in the single reversing maneuver for pulling the host vehicle A into the parking space P1. Although this path increases the traveling distance of the host vehicle A when the host vehicle A is pulled into the parking space compared to that of the path represented in FIG. 24, the path decreases the traveling distance as much as possible. However, discomfort caused to the driver by the reversal between rightward steering and leftward steering in the single reversing maneuver cannot be avoided.

Figure 26:
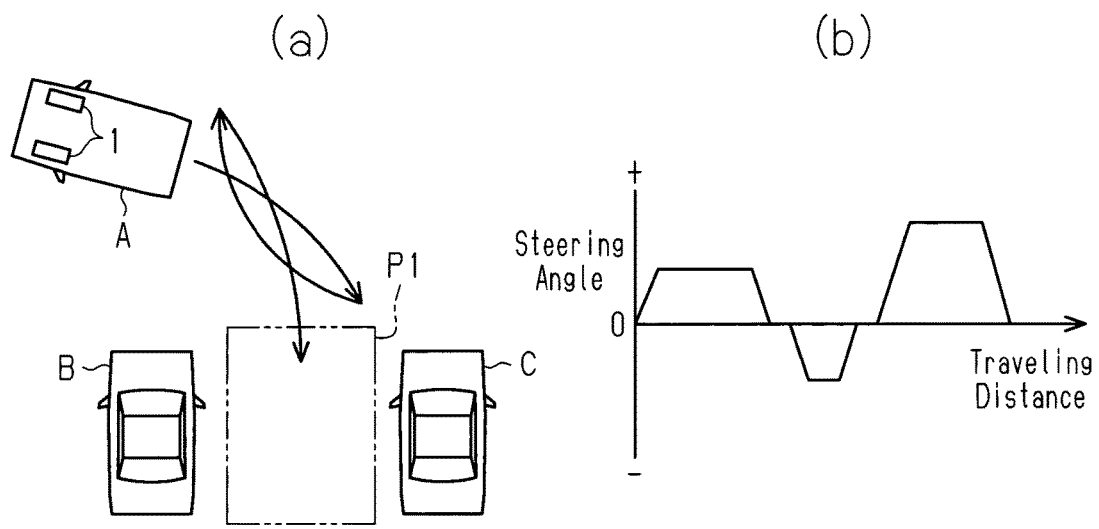
FIG. 26 includes a diagram illustrating another candidate path for pulling the host vehicle into the parking space through the automatic control and a graph representing the relationship between increase of the traveling distance of the host vehicle and changes in the steering angle when the host vehicle is moved along the path.
Figure 27:
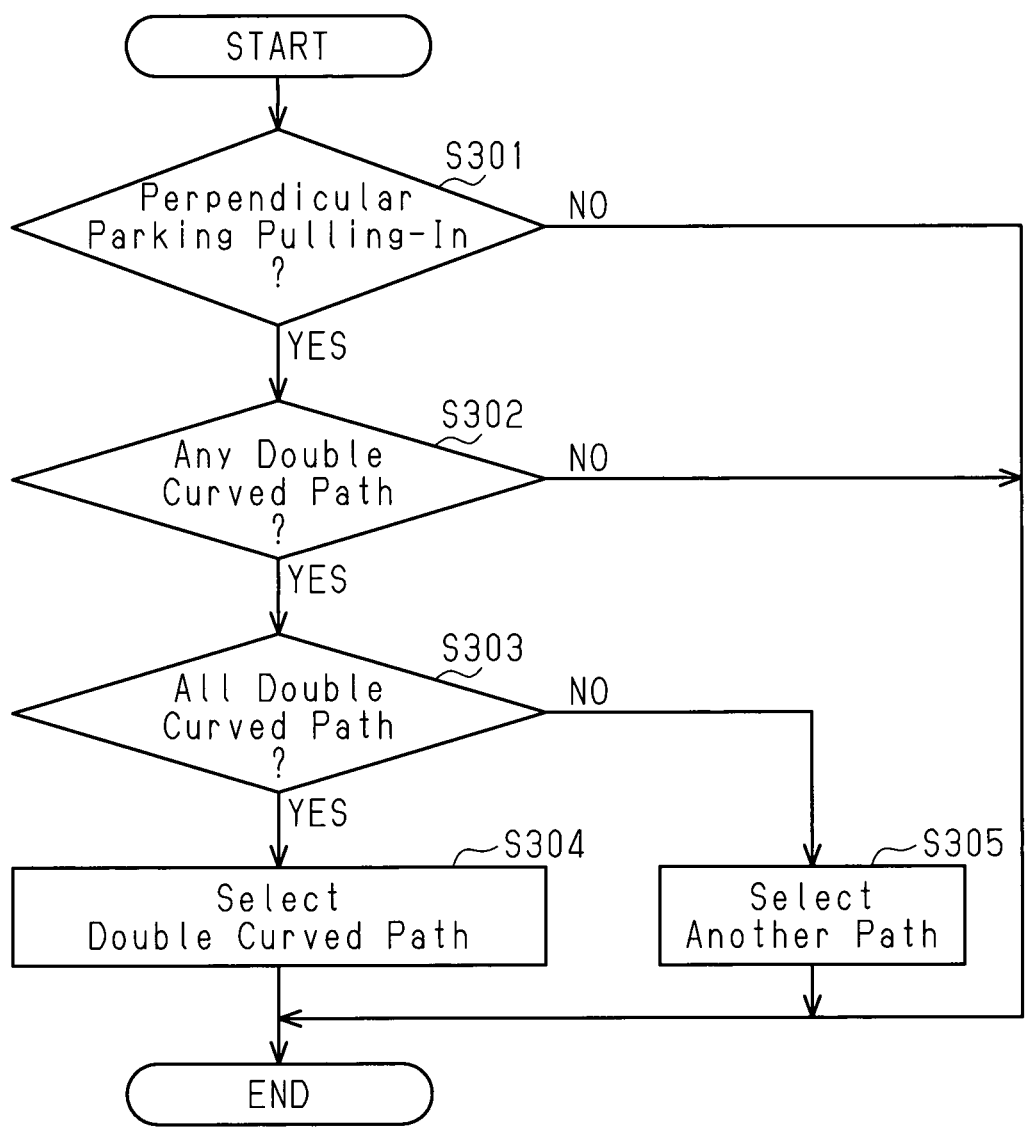
FIG. 27 is a flowchart representing a procedure for employing a non-double curved path or a double curved path when the host vehicle is pulled into the parking space through the automatic control.

In FIG. 26, section (a) represents a path for pulling the host vehicle A into the parking space P1 through advancing and reversing of the host vehicle A. Section (b) represents the relationship between increase of the traveling distance and changes in the steering angle of the host vehicle A when the host vehicle A is moved along the path represented in section (a). As is clear from FIG. 26, in the illustrated case, reversal between rightward steering and leftward steering occurs neither in the single advancing maneuver nor in reversing maneuver for pulling the host vehicle A into the parking space P1. Although this path increases the traveling distance of the host vehicle A when the host vehicle A is pulled into the parking space, the path restrains discomfort caused to the driver by the reversal between rightward steering and leftward steering in the single reversing maneuver.

As is clear from FIGS. 24 to 26, candidate paths for pulling the host vehicle A into the parking space P1 in a perpendicular parking manner through the automatic control include a path in which reversal between rightward steering and leftward steering of the host vehicle A occurs in a single advancing or reversing maneuver of the host vehicle A (hereinafter, referred to as a double curved path) and a path in which such reversal does not occur (a non-double curved path). As a path for which the electronic control unit 9 determines whether to start or prohibit the automatic control, the electronic control unit 9 employs the non-double curved path in priority to the double curved path.

The procedure for employing the double curved path or the non-double curved path is performed through the procedure of (D1) of the first and second embodiments, which is, in other words, S106 to S108 (FIG. 10) of the automatic control routine of the first embodiment or S206 and S207 of the automatic control routine of the second embodiment. Hereinafter, the procedure for employing the non-double curved path or the double curved path will be described in detail with reference to the flowchart of FIG. 27.

The electronic control unit 9 determines whether the current state is a state in which the host vehicle A will be pulled into the parking space in a perpendicular parking manner through the automatic control (S301). If a positive determination is made in this step, the electronic control unit 9 determines whether those remaining of candidate paths for pulling the host vehicle A into the parking space include a double curved path (S302). If a positive determination is made in this step, the electronic control unit 9 determines whether those remaining of the candidate paths for pulling the host vehicle A into the parking space are all double curved paths (S302). When a positive determination is made in S303, the electronic control unit 9 selects a double curved path as the candidate path (S304). If a negative determination is made in S303, the electronic control unit 9 selects a path other than double curved paths, which is, in other words, a non-double curved path, as the candidate path (S305).

The present embodiment as described above has the following advantage.

(7) By including a double curved path in the candidate paths for pulling the host vehicle A into the parking space P1 in a perpendicular parking manner through the automatic control, the number of the candidate paths is further increased. This increases the frequency of execution of the automatic control as much as possible. However, if the automatic control is performed to move the host vehicle A along a double curved path, it is likely that discomfort will be caused to the driver by corresponding movement of the host vehicle A. With this problem taken into consideration, the electronic control unit 9 employs a non-double curved path in priority to a double curved path as a path for which the electronic control unit 9 determines whether to start or prohibit the automatic control. This restrains discomfort caused to the driver by movement of the host vehicle A as much as possible when the automatic control is performed to move the host vehicle A along a double curved path and increases the frequency of execution of the automatic control.

Other Embodiments

The above described embodiments may be modified as follows.

In the third embodiment, a path along which the host vehicle A is pulled into the parking space P1 through a single advancing maneuver may be obtained as a candidate. In this case, a double curved path included in the candidate paths is a path in which reversal between rightward steering and leftward steering occurs in the single advancing maneuver.

In the third embodiment, the path may be corrected if the host vehicle A is displaced from the path during execution of the automatic control. The automatic control is performed along the corrected path. In this case, if a double curved path and a non-double curved path are listed each as a candidate for the corrected path, the non-double curved path may be employed in priority to the double curved path.

When the automatic control is started, the content of pulling-in or pulling-out assist for the host vehicle A with respect to the parking space P1 does not necessarily have to be informed to the driver.

In the first embodiment, the candidate paths for executing the automatic control may include a path that can be implemented through the automatic control assisted by steering operation by the driver.

In the second embodiment, the candidate paths for performing the automatic control do not necessarily have to include a path that can be implemented through the automatic control assisted by steering operation by the driver.

In the first and second embodiments, the automatic control may be used to pull the host vehicle A into or out of the parking space P1 in a perpendicular parking manner.

The temperature increase amount of the motor 2a caused by execution of the automatic control is influenced by variation in the pneumatic pressure of the vehicle wheels and variation in the total weight of the host vehicle A due to difference in the number of occupants. Information including the pneumatic pressure of the vehicle wheels and the total weight of the host vehicle A may be input by the driver by manipulating the display panel 3. The information is used by the electronic control unit 9 to calculate the temperature change amount ΔT. This improves accuracy of the calculated temperature change amount ΔT.

As the temperature of the steering device 2, the temperature of the ECU for controlling the motor 2a may be employed instead of the temperature of the motor 2a. In this case, the temperature sensor 18 detects the temperature of the ECU.

DESCRIPTION OF THE REFERENCE NUMERALS

1 . . . steerable Wheels, 2 . . . Steering Device, 2a . . . Motor, 3 . . . Display Panel, 4 . . . Speaker, 5 . . . Clearance Sonar, 6 . . . Ultrasonic Sensor, 7 . . . Clearance Sonar, 8 . . . Ultrasonic Sensor, 9 . . . Electronic Control Unit, 10 . . . Shift Lever, 11 . . . Shift Position Sensor, 12 . . .

Accelerator Pedal, 13 . . . Accelerator Position Sensor, 14 . . . Brake Pedal, 15 . . . Brake Switch, 16 . . . Vehicle Wheel Speed Sensor, 17 . . . Angle Sensor, 18 . . . Temperature Sensor, 19 . . . Yaw Rate Sensor

The invention claimed is:

1. A parking assist device adapted to assist a vehicle to be pulled into or out of a parking space through automatic control of a steering device, the parking assist device comprising:
a controller configured to:
obtain a plurality of candidate paths each as a path for pulling the vehicle into or out of the parking space,
calculate predicted temperatures of the steering device sequentially for cases in which the automatic control is performed to move the vehicle along the respective obtained candidate paths,
prohibit the automatic control when the predicted temperatures are higher than or equal to an allowable upper limit value, and
when one of the predicted temperatures is lower than the allowable upper limit value, start the automatic control to move the vehicle along the path corresponding to the one of the predicted temperatures.

2. The parking assist device according to claim 1, wherein the controller is configured to obtain, as the candidate paths for the vehicle, paths that are different in traveling distance, number of times of reversal of a steering direction, and manner in which a steering ratio is changed.

3. The parking assist device according to claim 1, wherein the controller is configured to be capable of obtaining, as the candidate paths, not only a path that can be implemented through the automatic control without needing steering operation by the driver, but also a path that can be implemented through the automatic control assisted by steering operation by the driver.

4. The parking assist device according to claim 1, wherein the controller is configured to, when starting the automatic control, inform the driver of contents of assist by the automatic control in pulling the vehicle in or out of the parking space.

5. The parking assist device according to claim 1, wherein
the automatic control is performed to pull the vehicle into one of parking spaces that are arranged side by side,
the candidate paths include a path in which reversal between rightward steering and leftward steering occurs in a single period of advancing or reversing of the vehicle and a path in which such reversal does not occur, and
the controller is configured to employ, as a path for which the controller determines whether to start or prohibit the automatic control, the path in which reversal in the steering direction does not occur in priority to the path in which the reversal occurs.

6. A parking assist device adapted to assist a vehicle to be pulled into or out of a parking space through automatic control of a steering device, the parking assist device comprising:
a controller configured to
obtain a first candidate path for pulling the vehicle into or out of the parking space,
calculate a predicted temperature of the steering device for when the automatic control is performed to move the vehicle along the first candidate path,
start the automatic control to move the vehicle along the first candidate path if the predicted temperature is lower than an allowable upper limit value,
prohibit the automatic control if the predicted temperature is higher than or equal to the allowable upper limit value,
obtain a second candidate path for pulling the vehicle into or out of the parking space after prohibiting the automatic control, and
selectively start and prohibit the automatic control based on the predicted temperature for the second candidate path in the same manner as that for the first candidate path.

7. The parking assist device according to claim 6, wherein the controller is configured to obtain, as the second candidate path for the vehicle, a path that is different from the first candidate path in traveling distance, number of times of reversal of a steering direction, and manner in which a steering ratio is changed.

8. The parking assist device according to claim 6, wherein the controller is configured to be capable of obtaining, as the candidate paths, not only a path that can be implemented through the automatic control without needing steering operation by the driver, but also a path that can be implemented through the automatic control assisted by steering operation by the driver.

9. The parking assist device according to claim 6, wherein the controller is configured to, when starting the automatic control, inform the driver of contents of assist by the automatic control in pulling the vehicle in or out of the parking space.

10. The parking assist device according to claim 6, wherein
the automatic control is performed to pull the vehicle into one of parking spaces that are arranged side by side,
the candidate paths include a path in which reversal between rightward steering and leftward steering occurs in a single period of advancing or reversing of the vehicle and a path in which such reversal does not occur, and
the controller is configured to employ, as a path for which the controller determines whether to start or prohibit the automatic control, the path in which reversal in the steering direction does not occur in priority to the path in which the reversal occurs.

* * * * *